United States Patent
Yang et al.

(10) Patent No.: US 10,496,541 B2
(45) Date of Patent: Dec. 3, 2019

(54) DYNAMIC CACHE PARTITION MANAGER IN HETEROGENEOUS VIRTUALIZATION CLOUD CACHE ENVIRONMENT

(71) Applicant: Samsung Electronics Co., Ltd., Suwon-si, Gyeonggi-do (KR)

(72) Inventors: Zhengyu Yang, Malden, MA (US); T. David Evans, San Marcos, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 42 days.

(21) Appl. No.: 15/891,350

(22) Filed: Feb. 7, 2018

(65) Prior Publication Data
US 2019/0163636 A1    May 30, 2019

Related U.S. Application Data

(60) Provisional application No. 62/592,355, filed on Nov. 29, 2017.

(51) Int. Cl.
| G06F 12/0846 | (2016.01) |
| G06F 17/18 | (2006.01) |
| G06F 9/455 | (2018.01) |

(52) U.S. Cl.
CPC ...... *G06F 12/0848* (2013.01); *G06F 9/45558* (2013.01); *G06F 17/18* (2013.01);
(Continued)

(58) Field of Classification Search
None
See application file for complete search history.

(56) References Cited

U.S. PATENT DOCUMENTS

| 8,656,134 B2 | 2/2014 | Gounares et al. |
| 8,775,868 B2 | 7/2014 | Colgrove et al. |

(Continued)

FOREIGN PATENT DOCUMENTS

| CN | 105808150 A | 7/2016 |
| KR | 101652324 B1 | 8/2016 |

OTHER PUBLICATIONS

Adinetz et al., "Performance Evaluation of Scientific Applications on POWER8", PMBS 2014, LNCS 8966, p. 24-45, 2015.
(Continued)

*Primary Examiner* — Edward J Dudek, Jr.
*Assistant Examiner* — Ralph A Verderamo, III
(74) *Attorney, Agent, or Firm* — Renaissance IP Law Group LLP

(57) ABSTRACT

A system is disclosed. The system may include a virtual machine server, which may include a processor, a memory, and at least two virtual machines that may be stored in the memory and executed by the processor. The virtual machine server may also include a virtual machine hypervisor to manage the operations of the virtual machine. The virtual machine server may also include a cache that may include at least one storage device. A Dynamic Cache Partition Manager (DCPM) may manage the partition of the cache into a performance guarantee zone, which may be partitioned into regions, and a spike buffer zone. The DCPM may include a reusability statistic calculator to calculate a reusability statistic, a comparator to compare the reusability statistic with a spike threshold, an access statistic calculator to calculate an access statistic, a spike data identifier to identify data in the spike buffer zone that satisfies the access statistic, and a cache partitioner to repartition the cache into a new performance guarantee zone and a second spike buffer zone for a new epoch, the second spike buffer zone is large enough to store the identified data.

27 Claims, 14 Drawing Sheets

(52) U.S. Cl.
CPC .............. *G06F 2009/45583* (2013.01); *G06F 2212/151* (2013.01)

(56) References Cited

U.S. PATENT DOCUMENTS

| | | | |
|---|---|---|---|
| 9,183,151 B2* | 11/2015 | Uttamchandani | ... G06F 12/0848 |
| 9,201,751 B1 | 12/2015 | Muthirisavenugopal et al. | |
| 9,513,835 B2 | 12/2016 | Alatorre et al. | |
| 9,535,844 B1 | 1/2017 | Cooney et al. | |
| 9,639,277 B2 | 5/2017 | Nakajima | |
| 9,665,621 B1 | 5/2017 | Reiner et al. | |
| 9,983,795 B1 | 5/2018 | Naamad et al. | |
| 10,095,621 B1* | 10/2018 | Birke | ... G06F 12/0868 |
| 10,254,970 B1 | 4/2019 | Martin et al. | |
| 10,289,958 B1 | 5/2019 | Tzur et al. | |
| 2009/0204959 A1* | 8/2009 | Anand | ... G06F 9/5027 |
| | | | 718/1 |
| 2013/0007254 A1 | 1/2013 | Fries | |
| 2013/0297872 A1 | 11/2013 | Hyde et al. | |
| 2014/0025890 A1* | 1/2014 | Bert | ... G06F 12/0842 |
| | | | 711/118 |
| 2014/0156965 A1 | 6/2014 | Yang et al. | |
| 2014/0359224 A1 | 12/2014 | Bisht | |
| 2015/0058540 A1 | 2/2015 | Bazzani | |
| 2016/0179582 A1 | 6/2016 | Skerry et al. | |
| 2016/0342447 A1 | 11/2016 | Richter et al. | |
| 2017/0223107 A1 | 8/2017 | Dayan et al. | |
| 2017/0235590 A1 | 8/2017 | Sinha et al. | |
| 2017/0235609 A1 | 8/2017 | Wires et al. | |
| 2017/0262204 A1 | 9/2017 | Dornemann et al. | |
| 2017/0371562 A1 | 12/2017 | Delaney et al. | |
| 2018/0018379 A1 | 1/2018 | Eda et al. | |
| 2018/0067961 A1* | 3/2018 | Yang | ... G06F 3/0685 |
| 2018/0088803 A1 | 3/2018 | Zhou | |
| 2018/0210656 A1 | 7/2018 | Sato et al. | |
| 2018/0357228 A1 | 12/2018 | Chen et al. | |

OTHER PUBLICATIONS

Office Action for U.S. Appl. No. 15/887,980, dated Sep. 26, 2019.

* cited by examiner

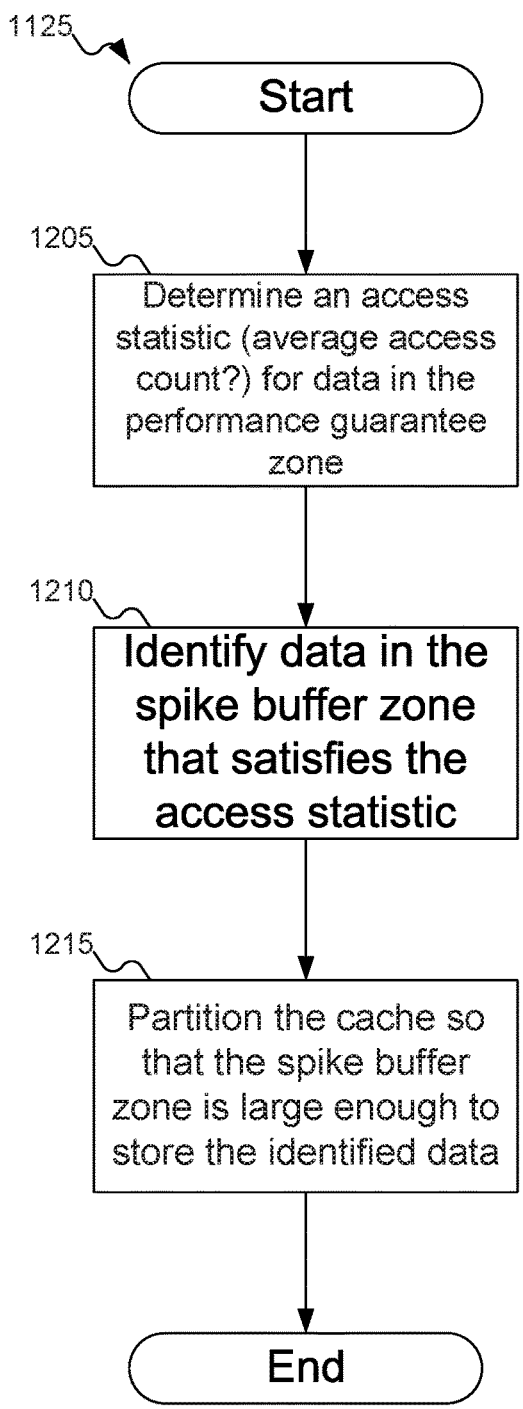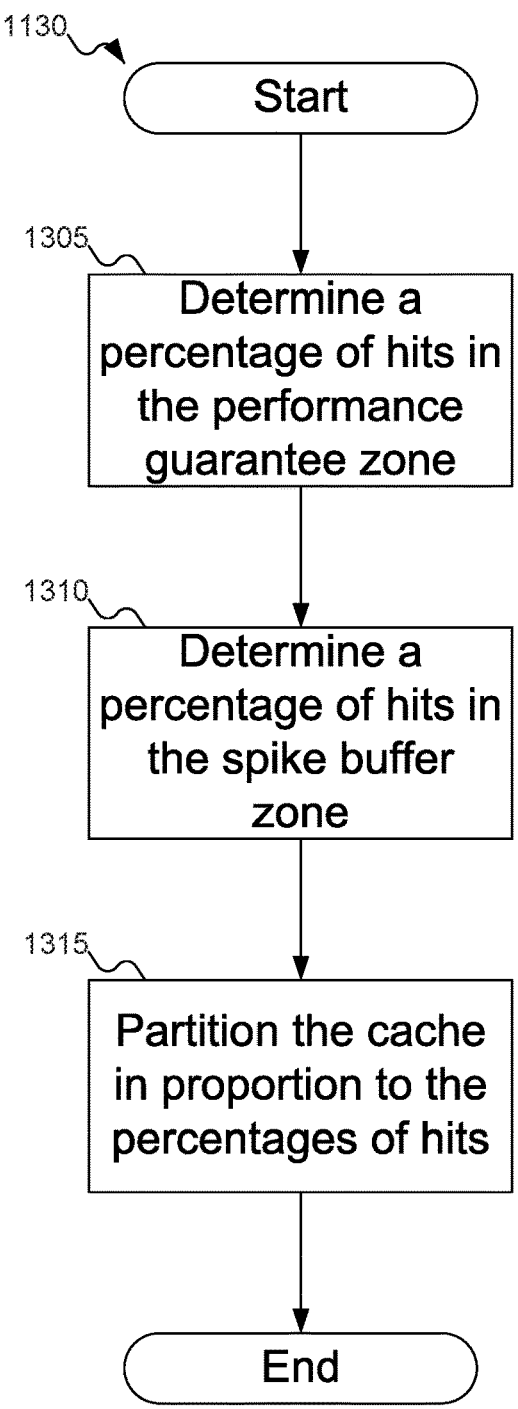
FIG. 12
FIG. 13

US 10,496,541 B2

DYNAMIC CACHE PARTITION MANAGER IN HETEROGENEOUS VIRTUALIZATION CLOUD CACHE ENVIRONMENT

RELATED APPLICATION DATA

This application claims the benefit of U.S. Provisional Patent Application Ser. No. 62/592,355, filed Nov. 29, 2017, which is incorporated by reference herein for all purposes.

FIELD

The inventive concepts relate generally to data storage, and more particularly to managing caches in virtual machine servers.

BACKGROUND

In a shared virtualized storage system that runs virtual machines (VMs) with heterogeneous I/O demands, it becomes a critical problem for the system to cost-effectively partition and allocate cache resources among multiple VMs. Heterogeneous VMs may have cross-VM impacts when sharing local cache resources and backend storage arrays.

A need remains for a way to more accurately predict VM workload changes and to track cache gains from past partition solutions.

BRIEF DESCRIPTION OF THE DRAWINGS

FIG. 12 shows a flowchart of an example procedure for the DCPM Daemon of FIG. 3 to partition the cache of FIG. 1 using an aggressive allocation strategy, according to an embodiment of the inventive concept.

FIG. 13 shows a flowchart of an example procedure for the DCPM Daemon of FIG. 3 to partition the cache of FIG. 1 using a conservative allocation strategy, according to an embodiment of the inventive concept.

DETAILED DESCRIPTION

Figure 1:
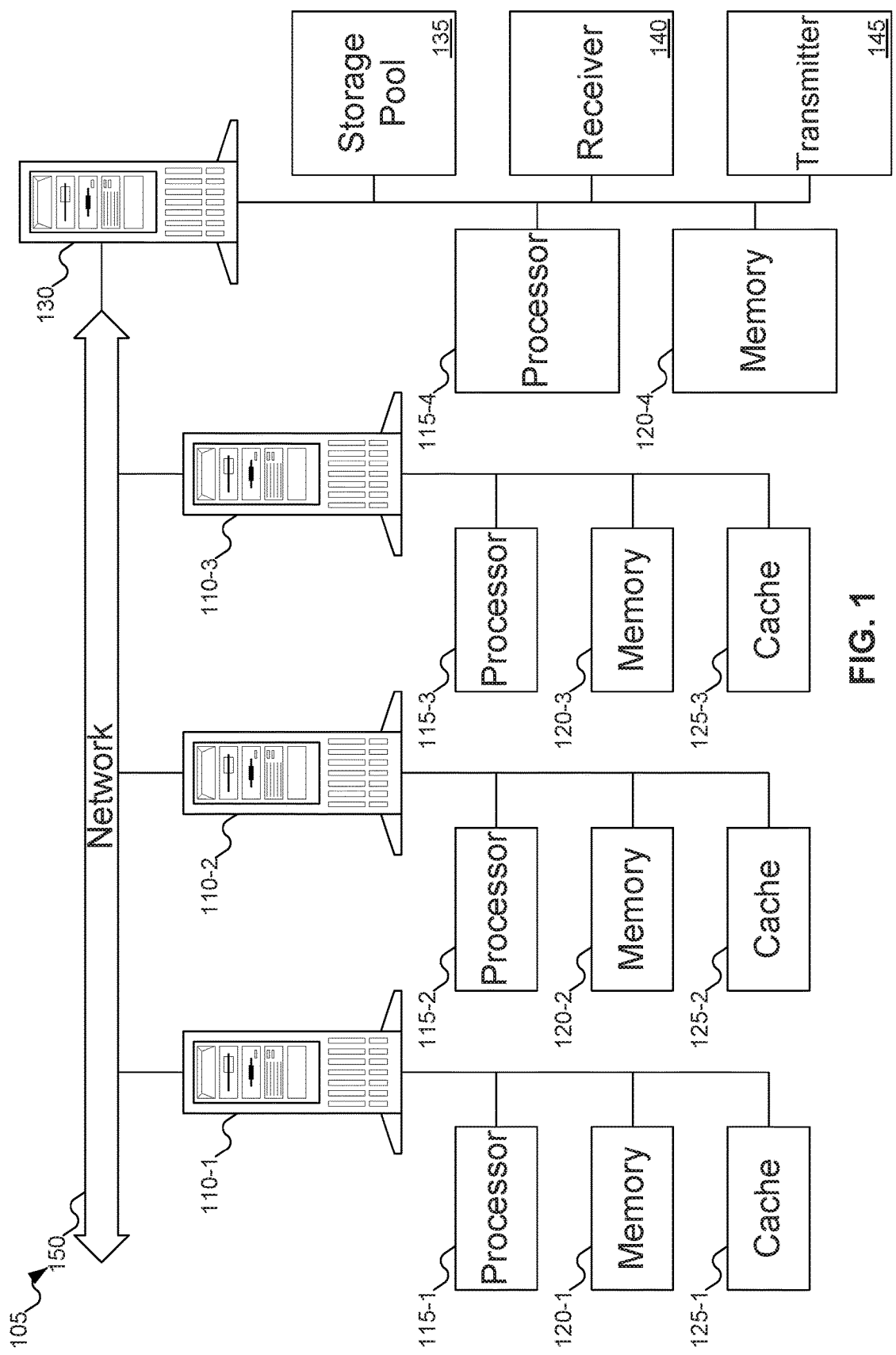
FIG. 1 shows networked machines that may host virtual machines and use a storage pool, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In a virtualized cloud computing environment, multiple virtual machine (VM) servers (also called "physical machines" (PMs), hosts, or physical servers) are running VM hypervisor software (such as Xen, KVM, VMware, etc.) to host multiple VMs. Inside each physical server, the hosted VMs are sharing the local resources of their host server, such as Central Processing Unit (CPU), Graphics Processing Unit (GPU), memory, Solid State Drives (SSDs) (flash storage, used to cache hot data), network, etc. PMs are connected to the backend storage pool.

Virtual machines run the guest Operating System (O/S) (e.g., Linux, Windows, etc.). Virtual machines may be isolated from each other. Cloud service vendors may "rent" these VMs to users. VMs may have different virtualized hardware and software resource configurations based on a vendor's plans and user demands. VMs may have different workload characteristics based on user applications (which are often called "heterogeneous" VMs). To address the problem of cache management, embodiments of the inventive concept focus on Input/Output (I/O) pattern characteristics. But as VMs may share SSD resources, I/O often is the bottleneck, so an objective is to minimize the cross-VM impact.

VM hypervisor software (such as Xen, KVM, VMware, etc.) may host multiple virtual machines (VMs). The VM hypervisor is responsible for scheduling, resource management, system software Application Programming Interfaces (APIs), and hardware virtualization. The Dynamic Cache Partition Manager (DCPM) daemon may be installed at the VM hypervisor level.

The local cache tier may be any desired format, such as a Hard Disk Drive (HDD), SSD or NVMe SSD array installed inside each server. SSDs are faster than conventional HDDs. VMs may share this cache. In terms of partitioning a cache tier, the cache tier may be regarded as a single logical volume: for example, Just a Bunch of Disks (JBOD), Just a Bunch of Flash (JBOF), or Redundant Array of Independent Disks (RAID) level 0.

All VM servers may be connected to a centralized storage pool to share the backend hard disk drive (HDD) or other storage resources. The backend storage pool may store all datasets, while local cache may store hot datasets. That is, local cache SSDs are performance-oriented, while storage pool HDDs are capacity-oriented. Different cache/replacement algorithms may be adopted to handle the HDD-SSD content update.

DCPM Daemons may run on the VM hypervisor of all physical machines. The DCPM Daemons may track the workload changes (I/O access pattern changes) of the VM server, and also records the status of cache, such as space usage, I/O hit ratio, etc.

A DCPM controller may be running on a dedicated server or the embedded system in the storage system. The DCPM controller may make decisions to partition the SSD resources for each VM on each PM. The DCPM controller may use the information collected by DCPM daemons to make these decisions. The decisions will be sent back to each DCPM daemon to conduct partitioning and dataset updates with HDD and SSD. Alternatively, the functionality attributed to the DCPM controller may be part of the DCPM Daemon.

The DCPM should achieve the following design goals:

(1) Use the local cache fast storage devices (SSD, NVMe SSD, etc.) to cache hot datasets. Unless necessary, DCPM should reduce storage pool I/O as much as possible by detecting and copying hot data to the local cache.

(2) Better utilize the local cache, adaptively assigning space size for each VM according to its workload change.

For (1), DCPM conducts dataset updates between the local cache and the storage pool in in any desired temporal granularity (e.g., 1 minute, 5 minutes, or longer) and coarse spatial granularity (i.e., the minimal data unit to be transferred between local cache and storage pool may be 512 KB, 1 MB, or larger).

But (2) presents a number of challenges.

Two straightforward approaches may be used to allocate SSD resources among multiple VMs.

One approach is to proportionally reserve SSD resources for each VM in the system such that all VMs are isolated in using their own assigned SSD resources. This approach will have fixed partition sizes for each VM. The fixed partition sizes for each VM are based on their weights, which in turn may be based on Service Level Agreements (SLAs) or workload changes (e.g., based on the reused dataset amount). In addition, the partition sizes may change during runtime. Note that the frequency should be low in order to reduce the overhead. Different cache replacement algorithms may be used by each VM to cache their recently accessed data blocks and the caching management is fully affected by their own workload changes.

A second approach manages SSD resources in a fair competition mode by allowing all VMs to freely use or share the entire SSDs to absorb spikes. In different epochs, VMs may have different sizes according to their workload changes. If, in one epoch, a particular VM has large I/O accesses, it may occupy a correspondingly large percentage of the available cache. A caching algorithm is usually used to centrally decide which data blocks should be held in SSDs for all VMs. Consequently, the caching management is inevitably affected by the intensity of all workload changes.

However, neither of these approaches may fully utilize the benefits of SSDs when some of VMs have spike I/O workloads during runtime. Although the first approach is able to avoid performance interference, VMs with workload spikes unfortunately have no chance to obtain more SSD resources during their spike periods. Each VM keeps the fixed amount of SSD resources during their runtime. On the other hand, the second approach solves this issue by allowing all VMs to compete for SSD resources based on their present I/O demands. But cache-unfriendly VMs may occupy more SSD resources when there are I/O spikes in their workloads. Thus, their I/O hit ratios are improved and the overall utilization of SSD resources is increased as well. But VMs with I/O spikes might occupy a large amount of the SSD resources during their spike periods by evicting other cached data, which might pollute critical caching of VMs with cache friendly workloads and then degrade their I/O hit ratios.

In order to ensure all VMs benefit from SSDs, a new resource management scheme, named DCPM, is presented, which strives to discriminate different workload types (e.g., cache-friendly and cache-unfriendly workloads) by splitting local cache SSDs into two zones, denoted as "$Z_P$" (Performance Guarantee Zone) and "$Z_S$" (Spike Buffer Zone). The cache is treated as one single logical volume with DCPM. The "Performance Guarantee Zone" may reserve SSD resources for each VM, and the "Spike Buffer Zone" may absorb and handle I/O spikes.

But simply fixing these partitions may not be optimal to general cases. For example, if VMs have a large number of bins being popular only during a short period, then $Z_S$ may not be large enough to handle I/O spikes that access those bins. This scenario may cause a very low I/O hit ratio and increase the operational costs for caching new bins in $Z_S$. Thus, it is also important to adjust the size of each VM inside the $Z_P$, and to adjust the bar between the "Performance Guarantee Zone" and "Spike Buffer Zone". Aiming to maximize the overall (write and read) I/O hit ratio and to minimize I/O cost (including I/O access and SSD-HDD updating costs), the following equations may define the operation of DCPM:

Maximize:

$$\sum_{i=1}^{m} Hr(C_i) - \varepsilon \cdot \sum_{i=1}^{m} \dot{C}o(C_i) \quad (1)$$

Subject to:

$$1 \le i \le m \quad (2)$$

$$C_{Z_P} + C_{Z_S} = C_T \quad (3)$$

-continued $$B_L(C_{Z_L}) \leq \sum_{i=1}^{m} C_{Z_L}(i) = C_{Z_L} \leq B_U(C_{Z_P}) \quad (4)$$

$$B_L(C_{Z_S}) \leq \sum_{i=1}^{m} C_{Z_S}(i) = C_{Z_S} \leq B_U(C_{Z_S}) \quad (5)$$

Where:

$$Co(C_i) = Co_{Access}(i) + Co_{Update}(i) \quad (6)$$

$$Co_{Access}(C_i) = T_{S_r} \cdot N_{S_r}(i) + T_{S_w} \cdot N_{S_w}(i) \quad (7)$$

$$Co_{Update}(C_i) = N_{H_r} \cdot T_{H_r}(i) + N_{H_w} \cdot N_{H_w}(i) \quad (8)$$

$$\dot{Co}(C_i) = \frac{Co(C_i)}{\max_{j \in [1,m]} Co(C_j)} \quad (9)$$

TABLE 1

List of symbols.

| Symbol | Description |
|---|---|
| $Hr(C_i)$ | Estimated or predicted hit ratio of i-th VM in the local cache SSD array. |
| $Co(C_i)$ | I/O update overhead (time cost) of i-th VM. |
| $\dot{Co}(C_i)$ | Normalized I/O update overhead (time cost) of i-th VM. |
| $\varepsilon$ | Knob to adjust the importance ratio between hit ratio and I/O overhead. |
| m | The total number of VMs on a VM server. |
| $C_{Z_P}, C_{Z_S}, C_T$ | Size of "Performance Guarantee Zone", "Spike Buffer Zone", and the total local cache SSD array. $C_T = C_{Z_P} + C_{Z_S}$ |
| $C_i$ | Assigned cache size of i-th VM. |
| $B_L(\ ), B_U(\ )$ | Pre-defined lower and upper bounds of the input zone. |
| $C_{Z_P}(i), C_{Z_S}(i)$ | Assigned cache size of i-th VM in "Performance Guarantee Zone" and "Spike Buffer Zone". |
| $Co_{Access}(i), Co_{Update}(i)$ | Time cost of access (either from local SSD or backend storage pool) and time cost of I/O update between local SSD and backend HDD. |
| $N_{S_r}(i), N_{S_w}(i), N_{H_r}(i), N_{H_w}(i)$ | Number of bins (minimum unit of I/O update data set), SSD read, SSD write, HDD read, and HDD write of i-th VM. |
| $T_{S_r}, T_{S_w}, T_{H_r}, T_{H_w}$ | SSD read, SSD write, HDD read, and HDD write time cost for one bin (minimum unit of I/O update data set, may be 1 MB, 10 MB, etc.). These may be pre-measured. |

The objective is to maximize the hit ratio and reduce the corresponding normalized I/O costs brought by the updates between SSD and HDD (Eq. 1). The I/O hit ratio function Hr( ) in Eq. 1 may either be directly monitored from the system during runtime, or be estimated by the other methods in use (i.e., the percentage of popularities of bins whose maximal re-visit distances are less than a given cache size). Eqs. 6-8 show the formulae to estimate I/O time cost corresponding for each I/O operation. Furthermore, the normalized I/O cost function is defined in Eq. 9. Finally, administrator-specified per-VM SSD space lower/upper bound for zones defined in Eqs. 4-5.

Solving the optimization framework may be difficult and time costly, so a low-cost heuristic approach has advantages. Specifically, the size of each VM inside the performance guarantee zone may be adaptively adjusted, as well as the partition sizes of two zones.

DCPM may attempt to reserve SSD resources in $Z_P$ for each VM in order to ensure that each VM has its own private cache for its critical hot data. One straightforward approach is to partition zone $Z_P$ among VMs equally or proportionally, i.e., $$C_{Z_P}(i) = C_{Z_P} \cdot w_i \quad (10)$$

Where $w_i$ is a fixed weight based on the Service-Level Agreement (SLA) for VM i and:

$$\Sigma_{i=1}^{m} w_i = 1 \quad (11)$$

In real implementation, a fixed amount (i.e., $C_{Z_P}(i)$) of the cache in $C_{Z_P}$ could be reserved for each VM. However, this approach may be ineffective when workloads frequently change and I/O spikes occur over time. Reserved cache resources may not be fully utilized when some VMs start to have a low I/O access rate and other VMs may not be able to obtain sufficient cache resources when they experience I/O spikes that need to access a large amount of unique data blocks (i.e., large working sets). Therefore, a partitioning algorithm to dynamically decide the capacity (i.e., $C_{Z_P}(i)$, or more specifically, $w_i$) for each VM's reserved cache in $Z_P$ based on both each VM's access history in the long term and their I/O workload changes may be used.

For example, consider a situation where there are four VMs, and during the last epoch, they each have the same sized regions in the Performance Guarantee Zone. As discussed above, this epoch may be set to a coarse granularity such as 5 minutes, or shorter or longer intervals as desired. Based on the history record of all their accesses (which may be a global sort of all bins by I/O access times), the VM region sizes in the Performance Guarantee Zone may be adjusted. On the other hand, DCPM puts top bins that are accessed only within the current epoch to the Spike Buffer Zone. As a result, the Spike Buffer Zone may offer fair competition and absorb I/O spikes.

When adjusting the size of the VM regions in the "Performance Guarantee Zone", the objective is for the "Performance Guarantee Zone" to capture long-term frequently-used datasets. The best way to know how much space each VM needs in the "Performance Guarantee Zone" is to estimate the size based on the last epoch's access bins. For example, if only the most recent epoch were used to predict VM region sizes, then the procedure would be:

1) On each VM server, globally sort all accessed I/O bins across all VMs on the VM server.

2): Pick a threshold number of bins, select that number of the sorted bins, and save them into the next epoch "Performance Guarantee Zone".

This procedure actually does two things: it determines each VM's size based on the current epoch access history, and it determines which bins should be cached. But only considering the most recent epoch may not be strong enough to predict a VM's actual cache needs and may be misled by I/O spikes during the most recent epoch. Therefore, more than the most recent epoch's access history may be used to refine the prediction. Convolutional weight functions may be used to fade out the impact of long-time-ago access history and assign higher weights to recent epochs. A sliding window including the last N epochs may be used to select the region size for each VM during the next epoch. In fact, the "most recent epoch" information method is actually a good candidate for estimating the size of the partition for the "Spike Buffer Zone".

But a static two-zone partition might not be optimal to general cases. For example, if workloads have a large number of bins being popular only during a short period, then $Z_S$ may not be large enough to handle I/O spikes that access those bins. This may cause a very low I/O hit ratio and increase the operational costs for caching new bins in $Z_S$. To solve this problem, a spike-detection-based partition algorithm that allows DCPM to dynamically adjust the sizes of $Z_P$ and $Z_S$ may be used.

DCPM may include two main components: a spike detector and a strategy switcher. The spike detector may take feedback about workload changes and cache performance (e.g., I/O hit or I/O miss) as the input to determine if the current workload is a spike or not. Based on the detected result, the strategy switcher may make different partitioning decisions to improve the cache resource utilization.

Table 2 shows an example of the spike detection procedure, where the sliding window size is N=3. As may be seen, there is no spike in the $4^{th}$ epoch (i.e., no new data is being accessed than may be found in the recently access history), but there is a spike in the $5^{th}$ epoch (i.e., more data is being accessed, including data that has not been accessed recently): the spike degrees for the $4^{th}$ and $5^{th}$ epochs are 0.167 and 0.533, respectively. The higher the spike degree is, the more spikes it has. Additionally, the spike detection threshold β may be pre-defined by the administrator. The lower the threshold β is, the more sensitive the system is.

TABLE 2

Example of spike detection.

| Epoch # | Accessed Bin ID | Sliding Window Value | Size of Sliding Window | Spike Degree |
|---|---|---|---|---|
| 1 | A, B, C | — | — | — |
| 2 | A, B, D, E | — | — | — |
| 3 | E, F, G | A, B, C, D, E, F, G | 7 | — |
| 4 | D, E, F, G | A, B, D, E, F, G | 6 | $\frac{\|6-7\|}{7} \approx 0.167$ |
| 5 | H, I, J, K, L, M, N, O, P, Q, R | D, E, F, G, H, I, J, K, L, M, N, O, P, Q, R | 15 | $\frac{\|15-7\|}{15} \approx 0.533$ |
| ... | ... | ... | ... | ... |

Initially, the two zones are each set to half of the entire cache (although they may also be set to any other ratios by the system administrator). Once the spike degree is calculated, the appropriate strategy may be selected by comparing the spike degree with a threshold β. If the current spike degree is greater than β, DCPM may use an aggressive allocation strategy, in which DCPM aggressively enlarges the capacity of $Z_S$. On the other hand, if the current spike degree is no greater than f, then DCPM may adjust the allocation of the cache to these zones in a more conservative manner. After this is complete, DCPM may then adjust the region for each VM in $Z_P$.

As discussed above, a "spike" may be defined as: I/O requests that have (1) relatively larger working set size (i.e., accessed address space) in a short period of time, and (2) relatively low reusability, which is defined as:

$$\text{Reusability} = \frac{WorkingVolume}{WorkingSetSize} \quad (12)$$

Basically, if the reusability is close to one, then it is almost a one-time-use pass which will pollute datasets in the local cache. A sliding window that contains multiple epoch access records may be used to calculate the spike degree ($B_d$). The objective is to calculate the percentage of data accesses in the current epoch that were not used in the most recent N epochs.

This sliding window may be the union set of recent N epoch access bin addresses. DCPM may track the changes in the working set sizes between the current and previous sliding windows (with $WS_{curSW}$ and $WS_{prevSW}$ representing the working sets for the windows in question, and $|WS_{curSW}|$ and $|WS_{prevSW}|$ representing their respective sizes). The relative size difference (which may be computed as the absolute value of the difference, to always return a positive value) between these two sliding windows may then be defined as spike degree (denoted as $B_d$), which may be better than using an absolute number.

When there are no spikes in the current I/O workloads—that is, $B_d<\beta$—DCPM may tune the partition between the two zones by leveraging the feedback of each zone's caching performance under the present partition. Specifically, DCPM may evaluate the importance of the two zones (i.e., their contributions to the overall I/O performance) by recording the total I/O hit volumes (i.e., the amount of all cached data that are hit by one or multiple I/O requests) in each zone during the recent epoch (e.g., 5 minutes). The contribution ratio ρ may be calculated as the ratio of the total number of I/O requests in the "Performance Guarantee Zone" and the "Spike Buffer Zone", respectively: that is, $$\frac{HV_P}{HV_S}.$$

Intuitively, the zone that contributes more to HVs the overall hit ratio is likely to get more cache resources and the allocation of the cache is proportional to the contribution ratio. This strategy is called "conservative allocation" because this hit-ratio-contribution-based strategy is relatively stable and is not likely to suddenly increase one zone size dramatically.

When I/O spikes are identified by the spike detector, DCPM may aggressively shift cache resources from one zone to the other. Using the contribution ratio as a feedback to reset the capacities of two zones unfortunately does not work well in this case because this approach may not quickly adapt to workload changes. Further, the delay in shifting resources after sudden workload changes may trigger a "cascade effect" (also called "thrashing effect") of insufficient capacity in one of the zones. For example, when I/O spikes that access new bins arrive, the I/O hit volume of $Z_S$ in the current epoch might not be large enough to get more cache resources to handle those I/O spikes. Consequently, the I/O hit volume of the "Spike Buffer Zone" might become even less in the next epoch, which triggers further reductions in future epochs and keeps reducing the capacity of $Z_S$.

To avoid such a cascade effect, DCPM may attempt to dynamically and aggressively assign more cache resources to $Z_S$ when I/O spikes are found in VM workloads, but still minimize the penalty on the caching performance of $Z_P$. The general idea is that if the working set size of accessed bins in the current epoch increases dramatically compared with the previous epoch, then it would also be helpful to increase the size of $Z_S$ to absorb the spikes in the near future. But how much cache resources should be added to $Z_S$?

We only need to aggressively increase $Z_S$ to cache reusable short-term hot bins, not all spike bins. To achieve this goal, another sliding window to record I/O popularity statistics for all bins that are accessed in recent several epochs (instead of the latest one) may be used. This sliding window may be of any size: for example, the most recent 10 epochs.

Having introduced the concept of "reusable short-term hot bins", this term needs to be defined. A fixed I/O access number (e.g., bins accessed 1000 times or more in the last epoch) could be used. But since VM workload I/O access is not limited to a certain range using a fixed absolute number as a standard to qualify short-term reusable hot bins might not scale up to larger clusters. Therefore, the average access number of data bins in the sliding window that are also found in the "Performance Guarantee Zone" may be used as the criterion to set the threshold for choosing short-term reusable hot bins to be cached in $Z_S$. DCPM may then find all the data bins that have been accessed in the current sliding window more than some threshold number of times but are not currently cached in $Z_P$. Such bins are defined to be the "reusable short-term hot bins". DCPM may then set the anticipated capacity of $Z_S$ to the total size of such bins.

FIG. 1 shows networked machines that may host virtual machines and use a storage pool, according to an embodiment of the inventive concept. In FIG. 1, system 105 is shown. System 105 may include virtual machine servers 110-1, 110-2, and 110-3. While FIG. 1 shows three virtual machine servers, embodiments of the inventive concept may support any number of virtual machine servers.

Each of virtual machine servers 110-1, 110-2, and 110-3 may include processors 115-1, 115-2, and 115-3, respectively, and memories 120-1, 120-2, and 120-3, respectively. Among other uses, processors 115-1, 115-2, and 115-3 may execute applications, such as applications being used by virtual machines running on virtual machine servers 110-1, 110-2, and 110-3, and which may be stored in memories 120-1, 120-2, and 120-3. Processors 115-1, 115-2, and 115-3 may be any varieties of processor: for example, an Intel Xeon, Celeron, Itanium, or Atom processor, an AMD Opteron processor, an ARM processor, etc. While FIG. 1 shows a single processor in each of virtual machine servers 110-1, 110-2, and 110-3, virtual machine servers 110-1, 110-2, and 110-3 may each include any number of processors, each of which may be single core or multi-core processors, and may be mixed in any desired combination. Memories 120-1, 120-2, and 120-3 may each be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memories 120-1, 120-2, and 120-3 may each also be any desired combination of different memory types. Memories 120-1, 120-2, and 120-3 may be controlled by a memory controller (not shown in FIG. 1), also part of virtual machine servers 110-1, 110-2, and 110-3.

Virtual machine servers 110-1, 110-2, and 110-3 may each also include local storage devices. For example, virtual machine servers 110-1, 110-2, and 110-3 may include caches 125-1, 125-2, and 125-3, respectively. Local storage devices such as caches 125-1, 125-2, and 125-3 may take any desired form, such as Hard Disk Drives (HDDs) or Solid State Drives (SSDs), and may use any desired connector, such as Peripheral Component Interconnect (PCI), PCI Express (PCIe), Serial AT Attachment (SATA), Non-Volatile Memory Express (NVMe), NVMe over Fabric (NVMeoF), M.2, or any other desired connection. Embodiments of the inventive concept may be combined with embodiments of the inventive concept disclosed in U.S. patent application Ser. No. 15/887,980, filed Feb. 2, 2018, which claims the priority from U.S. Patent Application Ser. No. 62/534,647, filed Jul. 19, 2017, both of which are incorporated by reference herein for all purposes.

System 105 may also include data center server 130. Like virtual machine servers 110-1, 110-2, and 110-3, data center server 130 may include processor 115-4 and memory 120-4. But data center server 130 may also include storage pool 135, receiver 140, and transmitter 145. Storage pool 135 may be a pool of storage devices organized into storage tiers. In some embodiments of the inventive concept, storage pool 135 may include only SSD or other flash memory devices; in other embodiments of the inventive concept, storage pool 135 may include storage devices using other storage formats. Receiver 140 may receive Input/Output (I/O) commands and other data from virtual machine servers 110-1, 110-2, and 110-3, and transmitter 145 may transmit data to virtual machine servers 110-1, 110-2, and 110-3.

Virtual machine servers 110-1, 110-2, and 110-3, and data center server 130, are shown connected via network 150. Using network 150, virtual machine servers 110-1, 110-2, and 110-3 may send I/O commands to data center server 130, and may receive responses therefrom. Virtual machine servers 110-1, 110-2, and 110-3 and data center server 130 may all be part of a Local Area Network (LAN), or may include other network types, such as a Wide Area Network (WAN), or a global network such as the Internet. Network 150 may also be a combination of multiple such networks, in any desired combination.

Although FIG. 1 depicts virtual machine servers 110-1, 110-2, and 110-3 and data center server 130 as servers (and could each be either standalone or rack servers), embodiments of the inventive concept may include virtual machine servers 110-1, 110-2, and 110-3 and data center server 130 each of any desired type without limitation. For example, the servers shown in FIG. 1 could each be replaced with desktop or laptop computers or any other device that may benefit from embodiments of the inventive concept. Virtual machine servers 110-1, 110-2, and 110-3 and data center server 130 may each also include specialized portable computing devices, tablet computers, smartphones, and other computing devices. For purposes of description, Virtual machine servers 110-1, 110-2, and 110-3 are described as hosting virtual machines, but embodiments of the inventive concept may include machines that are not virtual machines running on virtual machine servers 110-1, 110-2, and 110-3. For example, virtual machine servers 110-1, 110-2, and 110-3 could include a computer that includes multiple applications running in parallel that may compete for the resources of caches 125-1, 125-2, and 125-3.

Figure 2:
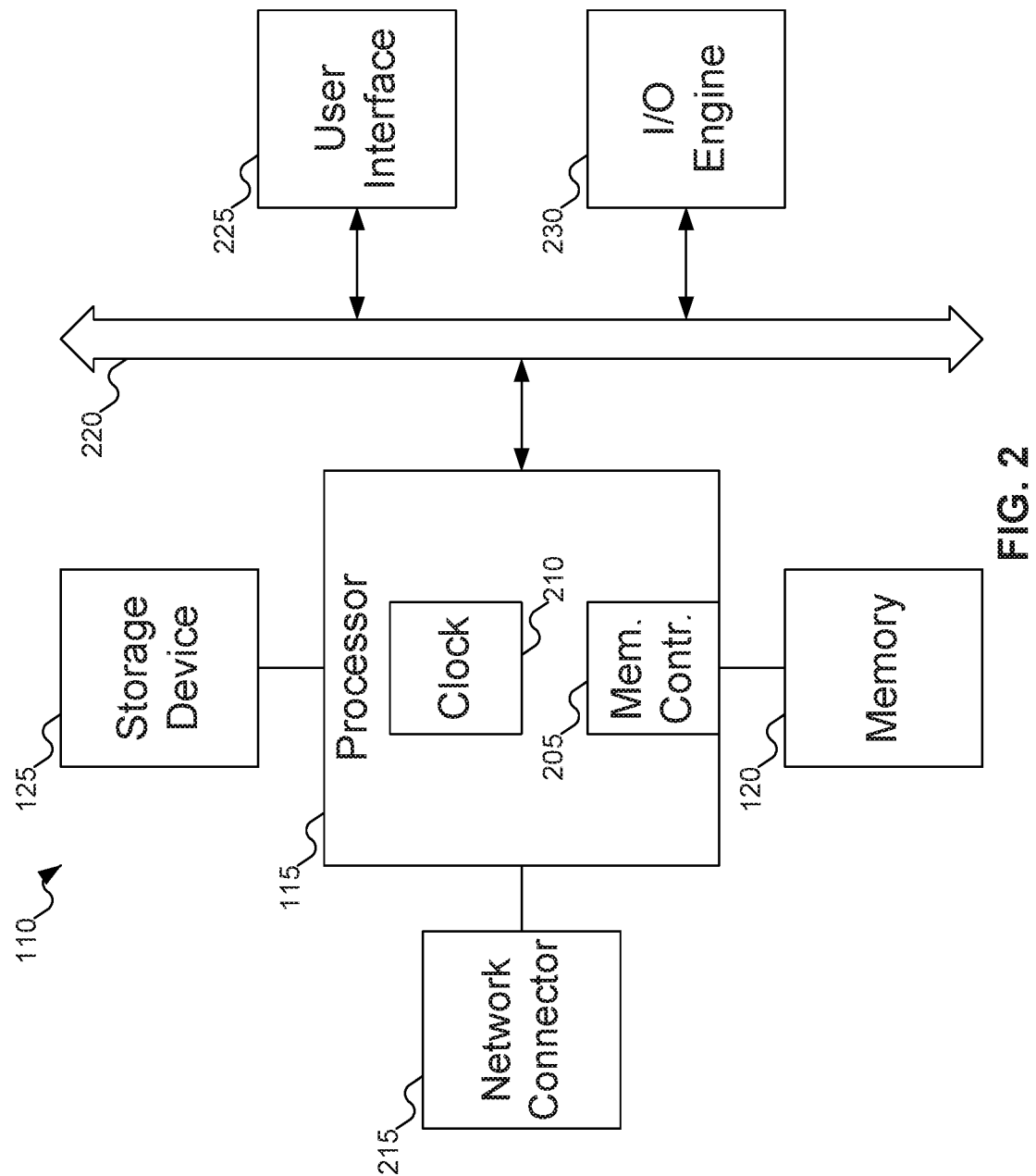
FIG. 2 shows additional details of the machines of FIG. 1.

FIG. 2 shows additional details of servers 110-1, 110-2, 110-3, and 130 of FIG. 1. In FIG. 2, typically, server 110 (which may represent either of servers 110-1, 105-2, or 110-3 of FIG. 1) includes one or more processors 115, which may include memory controllers 205 and clocks 210, which may be used to coordinate the operations of the components of server 110. Processors 115 may also be coupled to memories 120, which may include random access memory (RAM), read-only memory (ROM), or other state preserving media, as examples. Processors 110 may also be coupled to storage devices 125, and to network connector 215, which may be, for example, an Ethernet connector or a wireless connector. Processors 115 may also be connected to buses 220, to which may be attached user interfaces 225 and Input/Output interface ports that may be managed using Input/Output engines 230, among other components.

Figure 3:
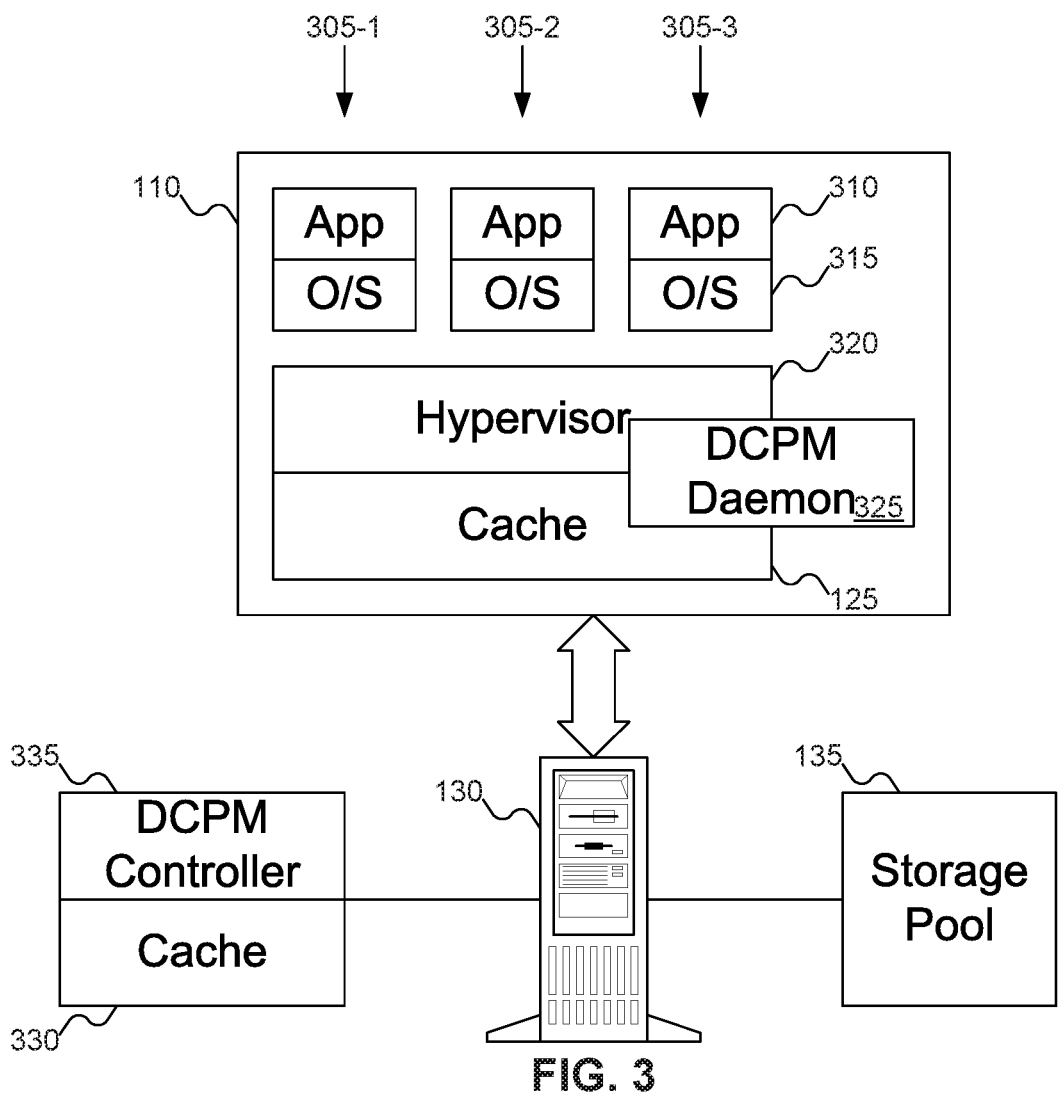
FIG. 3 shows added detail of one server of FIG. 1 interacting with the storage pool of FIG. 1, according to an embodiment of the inventive concept.

FIG. 3 shows added detail of one server of FIG. 1 interacting with the storage pool of FIG. 1, according to an embodiment of the inventive concept. In FIG. 3, virtual machine server 110 is shown as hosting three virtual machines 305-1, 305-2, and 305-3, but embodiments of the inventive concept may include any number of virtual machines being hosted by virtual machine server 110. While only virtual machine 305-3 described in greater detail below, embodiments of the inventive concept include other virtual machines, such as virtual machines 305-1 and 305-2, operating similarly. Virtual machine 305-3 is shown as including application 310 running on operating system 315. Hypervisor 320 may manage the operations virtual machines 305-1, 305-2, and 305-3 running on virtual machine server 110. Hypervisor 320 may also interact with storage pool 135 to send Input/Output (I/O) requests from virtual machines 305-1, 305-2, and 305-3.

Virtual machine server 110 may also include cache 125. Cache 125 may include local storage for datasets accessed by virtual machines 305-1, 305-2, and 305-3. Dynamic Cache Partition Manager (DCPM) Daemon 325, which may be implemented within hypervisor 320, may manage the partitioning of cache 125 for use by virtual machines 305-1, 305-2, and 305-3, as described below.

As described above, FIG. 3 shows virtual machine server 110 with its own local cache 125, which mirrors FIG. 1 showing virtual machine servers 110-1 110-2, and 110-3 each with their own caches 125-1, 125-2, and 125-3, respectively. But embodiments of the inventive concept do not limit the location of cache 125 to within virtual machine server 110. For example, data center server 130 may include its own cache 330, which may be shared among virtual machines 305-1 through 305-3 on virtual machine server 110, or shared among virtual machines across multiple virtual machine servers 110-1, 110-2, and 110-3 of FIG. 1. Alternatively, cache 125 might be part of another machine somewhere between data center server 130 and virtual machine servers 110-1, 110-2, and 110-3 of FIG. 1, providing caching services to some of those servers but not all of them. While these setups might seem unusual, if, for example, cache 125 includes SSDs and storage pool 135 includes hard disk drives, cache 125 may be a shared resource across virtual machine servers 110-1, 110-2, and 110-3 of FIG. 1 and still useful. In such embodiments of the inventive concept, the functions performed by the DCPM may be split between DCPM Daemon 325 and DCPM Controller 335. DCPM Daemon 325 may measure the workloads of the individual virtual machines located on virtual machine server 110, and DCPM Controller 335 may manage the partitioning of cache 330, as described below. Alternatively, either DCPM Daemon 325 or DCPM Controller 335 may perform all of the functionality describe below. The term DCPM is intended to represent the overall operations of DCPM Daemon 325 and DCPM Controller 335, whether a system includes only one or both of these components.

Even in embodiments of the inventive concept where virtual machine server 110 includes local cache 125, the functions of the DCPM may be split between DCPM Daemon 325 and DCPM Controller 335 in a similar manner. For example, each virtual machine server 110-1, 110-2, and 110-3 of FIG. 1 may include its own local cache 125 and its own DCPM Daemon 325 to measure virtual machine workloads, and DCPM Controller 335, shown in FIG. 3 as resident in data center server 130, may manage the partitioning of each local cache. Embodiments of the inventive concept may also separate caches 125 and/or 130 from either or both of DCPM Daemon 325 and DCPM Controller 335: that is, caches 125 and/or 130 might be on separate machines from DCPM Daemon 325 and DCPM Controller 335.

As mentioned above, the DCPM functionality may be divided between DCPM Daemon 325 and DCPM Controller 335, depending on the embodiment of the inventive concept. In the remainder of this document, DCPM Daemon 325 is described as performing all of the functionality of the DCPM for simplicity of description.

The above description uses the term "cache" to describe the operation of the intermediary storage (between virtual machines 305-1 through 305-3 and data center server 130). Traditionally, the term "cache" is used to describe a storage system that is faster than the more permanent/larger storage location for the data, but that is also smaller in size. Accordingly, when new data is accessed that is not currently resident in the cache, the cache might evict some data currently stored in the cache in favor of storing the newly requested data. (If the evicted data is then accessed again, the evicted data would generate a cache miss, forcing data retrieval from the more permanent/larger storage and possibly evicting some additional data from the cache). Caches may use any desired algorithm to select what data to evict, such as Least Recently Used (LRU) and Least Frequently Used (LFU) to name two common cache eviction strategies.

While caches 125 and/or 330 may operate in this manner, evicting data as needed when new data is accessed, in other embodiments of the inventive concept caches 125 and/or 330 may operate differently. For example, in some embodiments of the inventive concept, caches 125 and/or 330 might only update their stored data at the start of a new epoch (epochs are discussed more below with reference to FIG. 9). That is, when a new epoch begins, caches 125 and/or 330 may evict some data and add some new data, based on the recent data access patterns of virtual machines 305-1 through 305-3. If new data, not currently in caches 125 and/or 330, is requested, that new data is accessed from storage pool 135 but is not stored in caches 125 and/or 330 (unless the DCPM decides to include that data in caches 125 and/or 330 at the start of the next epoch). Such a cache might be called a "lazy cache" or "coarse granularity cache".

Figure 4:
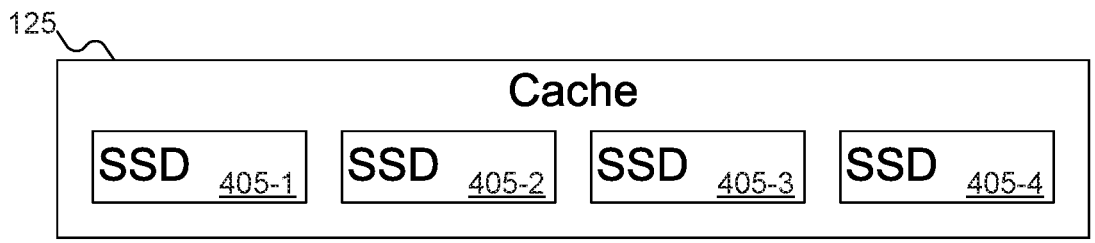
FIG. 4 shows details of the cache of FIG. 1.

FIG. 4 shows details of cache 125 of FIG. 1. In FIG. 4, cache 125 is shown as including for Solid State Drives (SSDs) 405-1, 405-2, 405-3, and 405-4. But embodiments of the inventive concept may include cache 125 including any number of storage devices, which may be of any desired format (SSD, Hard Disk Drive (HDD), etc.). Generally, embodiments of the inventive concept may treat cache 125 as though it were a single storage unit, regardless of its makeup. Thus, for example, storage devices 405-1, 405-2 405-3 and 405-4 may be implemented as Just a Bunch of Disks (JBOD), Just a Bunch of Flash (JBOF), Redundant Array of Independent Disks (RAID) level 0, or any other desired configuration that may be treated as a single storage unit.

Figure 5A:
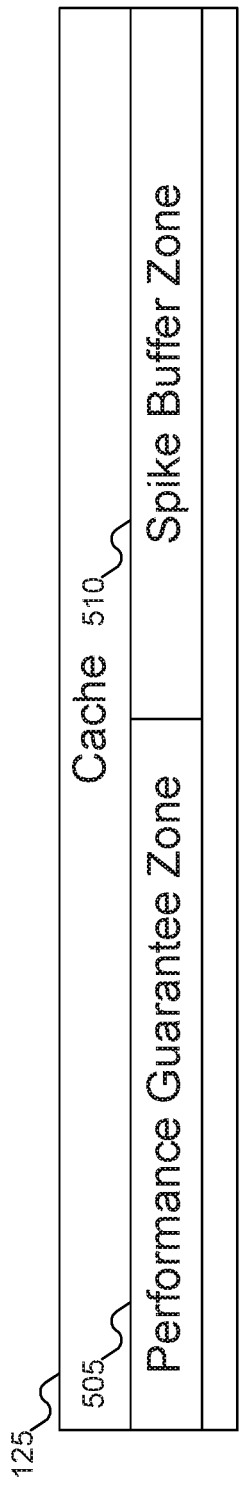
FIGS. 5A-5C show various partitions of the cache of FIG. 1 into performance guarantee zones and spike buffer zones.
Figure 5B:
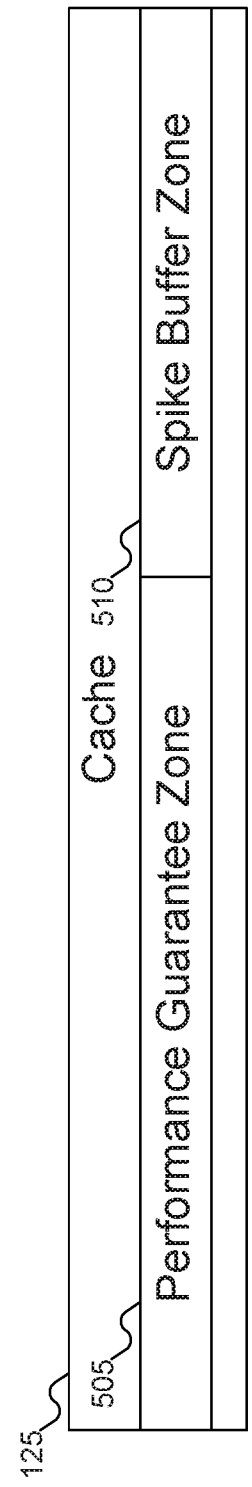
Figure 5C:
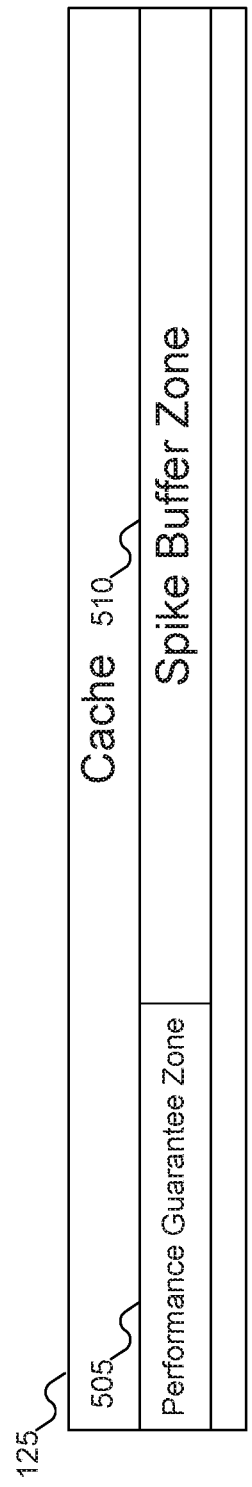

FIGS. 5A-5C show various partitions of cache 125 of FIG. 1 into performance guarantee zones and spike buffer zones. In FIG. 5A, cache 125 may be initially partitioned into equally-sized performance guarantee zone 505 and spike buffer zone 510. Then, after a few epochs with no workload spikes, spike buffer zone 510 might be reduced in size and performance guarantee zone 505 might be increased, as shown in FIG. 5B. At a few more epochs where there have been workload spikes, spike buffer zone 510 might be increased and performance guarantee zone 505 might be reduced, as shown in FIG. 5C. This shows how DCPM may adjust the amount of storage in cache 125 allocated to performance guarantee zone 505 and spike buffer zone 510 as the workload demands of the various virtual machines change.

Figure 6:
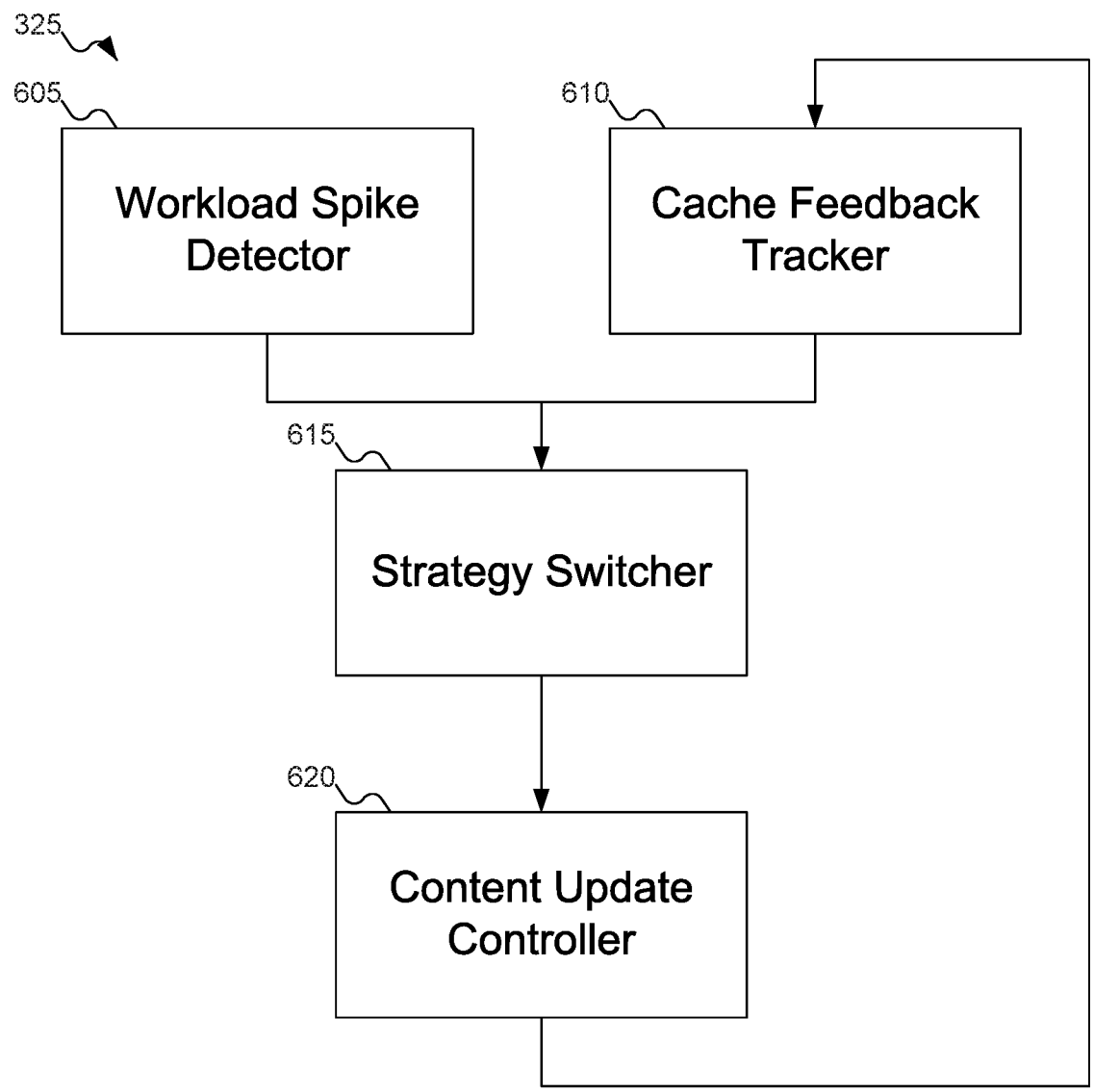
FIG. 6 shows a high-level operational flow of the Dynamic Cache Partition Manager (DCPM) Daemon of FIG. 3.

FIG. 6 shows a high-level operational flow of Dynamic Cache Partition Manager (DCPM) Daemon 325 of FIG. 3. DCPM Daemon 325 may have workload spike detector 605 determine whether there have been workload spikes in the virtual machines in server 110 of FIG. 3. In addition, DCPM Daemon 325 may receive feedback from cache feedback tracker 610, indicating how well cache 125 of FIG. 1 performed using a partition from a previous epoch. DCPM Daemon 325 may then use this information to select a strategy to repartition cache 125 of FIG. 1 using strategy switcher 615, and the content update controller 620 may update how cache 125 of FIG. 1 is partitioned based on strategy switcher 615.

Figure 7:
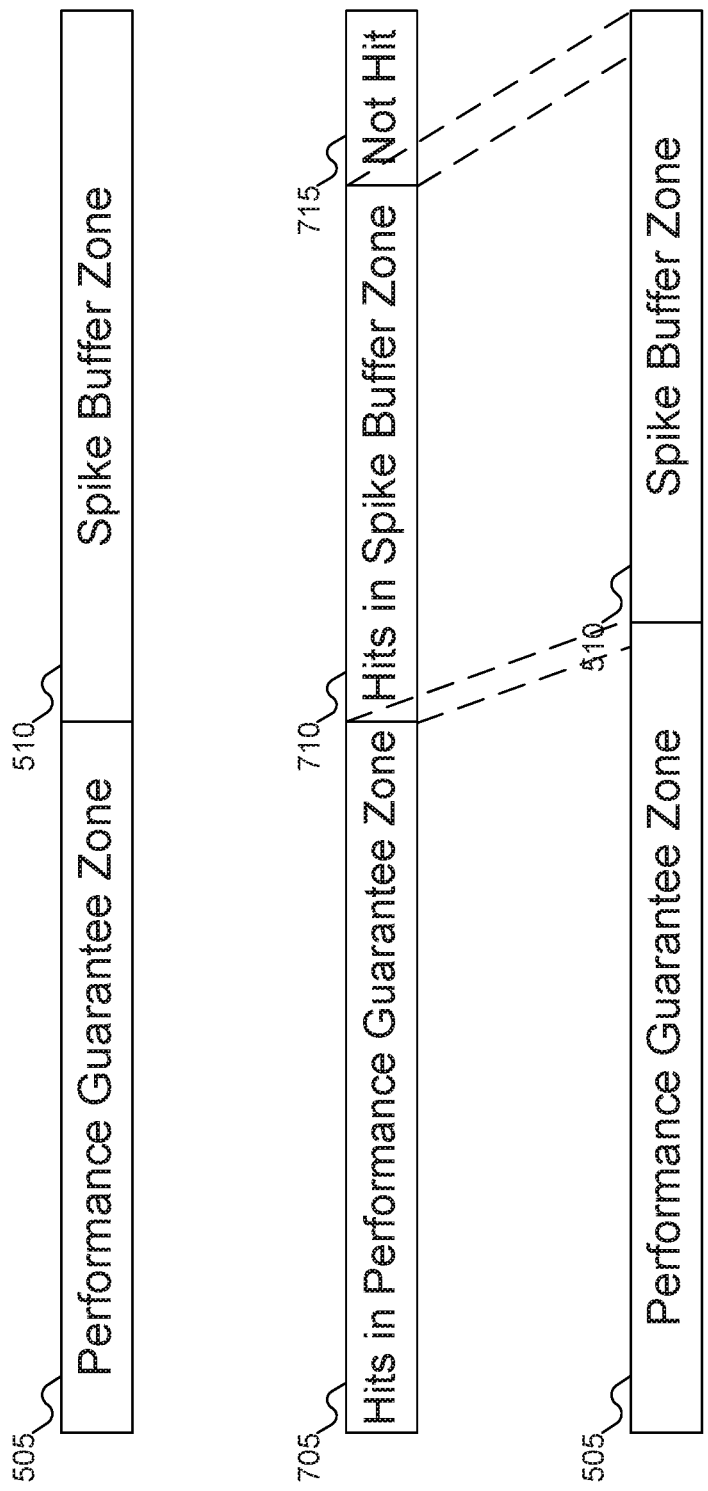
FIG. 7 shows how the cache of FIG. 1 may be partitioned when there are no workload spikes, according to an embodiment of the inventive concept.

FIG. 7 shows how cache 125 of FIG. 1 may be partitioned when there are no workload spikes, according to an embodiment of the inventive concept. When there are no workload spikes, spike buffer zone 510 does not need to be as large, since there are no I/O spikes to worry about. In that situation, performance guarantee zone 505 may be larger to handle more regular data accesses.

To adjust the partition of cache 125 for the next epoch, DCPM Daemon 325 of FIG. 3 may identify all the data addresses accessed in I/O requests by virtual machines 305-1, 305-2, and 305-3 in FIG. 3 in the current epoch. These data addresses may then be organized into three groups: data hits 705 in performance guarantee zone 505, data hits 710 in spike buffer zone 510, and data misses 715. Performance guarantee zone 505 and spike buffer zone 510 may then be repartitioned in proportion to the number of data hits 705 and 710 in each zone. So, for example, assume that of all I/O requests issued by virtual machines 305-1, 305-2, and 305-3 during the current epoch, 60% of the I/O requests resulted in data hits in performance guarantee zone 505, 30% of all the I/O requests resulted in data hits in spike buffer zone 510, and 10% of the I/O requests resulted in data misses: that is, the data was not found in cache 125 of FIG. 1. This fact pattern shows that ⅔ of all the I/O requests that resulted in data hits were for data found in performance guarantee zone 505, and ⅓ of all the I/O requests that resulted in data hits were for data found in spike buffer zone 510. In that situation, performance guarantee zone 505 and spike buffer zone 510 may be repartitioned so that performance guarantee zone 505 is allocated ⅔ of the storage in cache 125 of FIG. 1, and spike buffer zone 510 is allocated ⅓ of the storage in cache 125 of FIG. 1. Note that data misses 715 do not factor into this calculation, since they did not result in cache hits.

As described above, this analysis may be performed using more data than just the most recent epoch. For example, memory 120 of FIG. 1 may store historical information about data hits and misses in cache 125 of FIG. 1, and this historical information may be factored into the analysis. Thus, for example, data hits 705 and 710 may factor in data hits in both the current epoch and in older epochs. For example, a sliding window of the last, say, 10 epochs may be stored as the historical information, and this sliding window of historical data may be used in determining how to partition cache 125 of FIG. 1. To prevent older performance data that might be aberrant (relative to newer performance data), older data may be given lower weights than newer epochs: for example, using a convolution function. Any desired weighting function may be used to manage the impact of older performance data.

Figure 8:
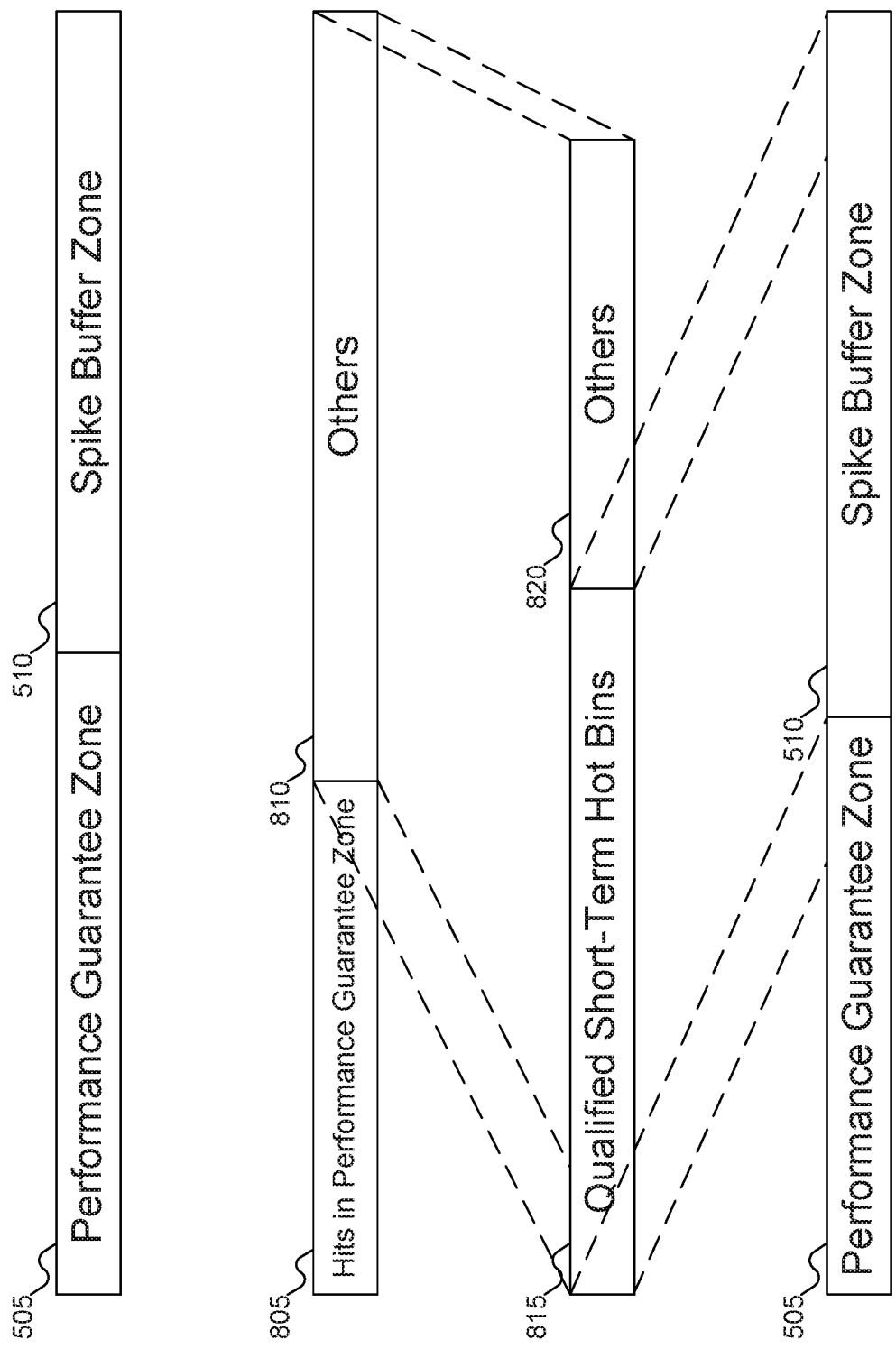
FIG. 8 shows how the cache of FIG. 1 may be partitioned when there are workload spikes, according to an embodiment of the inventive concept.

FIG. 8 shows how cache 125 of FIG. 1 may be partitioned when there are workload spikes, according to an embodiment of the inventive concept. Similarly to FIG. 7, in FIG. 8, the data hits in cache 125 of FIG. 1 may be divided into those data hits 805 that were satisfied by performance guarantee zone 505 and those data hits 810 that were satisfied somewhere else (i.e., spike buffer zone 510). But instead of partitioning performance guarantee zone 505 and spike buffer zone 510 in proportion to the number of data hits in each zone, instead another calculation may be used.

From data hits 805 in performance guarantee zone 505, an access statistic may be used. Any access statistic may be used: an embodiment of the inventive concept may use an average access count. The average access count may be calculated as the total number of data accesses for data in performance guarantee zone 505, divided by the number of data addresses being accessed. This average access count may be used to divide data hits 810 in spike buffer zone 510 into qualified short-term hot bins 815 and other hits 820. Spike buffer zone 510 may then be allocated enough of cache 125 of FIG. 1 to include all the data in qualified short-term hot bins 815, with the remaining storage of cache 125 of FIG. 1 being allocated to performance guarantee zone 505.

As noted above, FIGS. 7-8 reflect different strategies for allocating between performance guarantee zone 505 and spike buffer zone 510. The question then becomes, when to use each allocation strategy. DCPM Daemon 325 of FIG. 3 may calculate a reusability statistic, which may represent how much data in cache 125 of FIG. 1 represents workload spikes and how much data in cache 125 of FIG. 1 represents long-term data. This reusability statistic may then be compared with a spike threshold value, which may be set by the system administrator to any desired threshold. If the reusability statistic exceeds (or is at least as large as) the spike threshold, then the aggressive allocation strategy shown in FIG. 8 may be used; otherwise, the conservative allocation strategy shown in FIG. 7 may be used.

The reusability statistic, then, becomes the important variable. The reusability statistic may be computed by calculating the difference between the size of the dataset in the current epoch and the size of the dataset in the previous epoch. This difference may then be divided by the size of the current dataset to produce a value that reflects how much larger the current dataset is to the previous dataset. This increase, which may be called the reusability statistic, represents how much of the data in cache 125 of FIG. 1, was the result of workload I/O spikes, and therefore reflects how much of the workload is being managed by spike buffer zone 510 of FIGS. 5A-5C as compared with performance guarantee zone 505 of FIGS. 5A-5C. When compared with the spike threshold, the reusability statistic may indicate whether aggressive or conservative allocation should be used.

Figure 9:
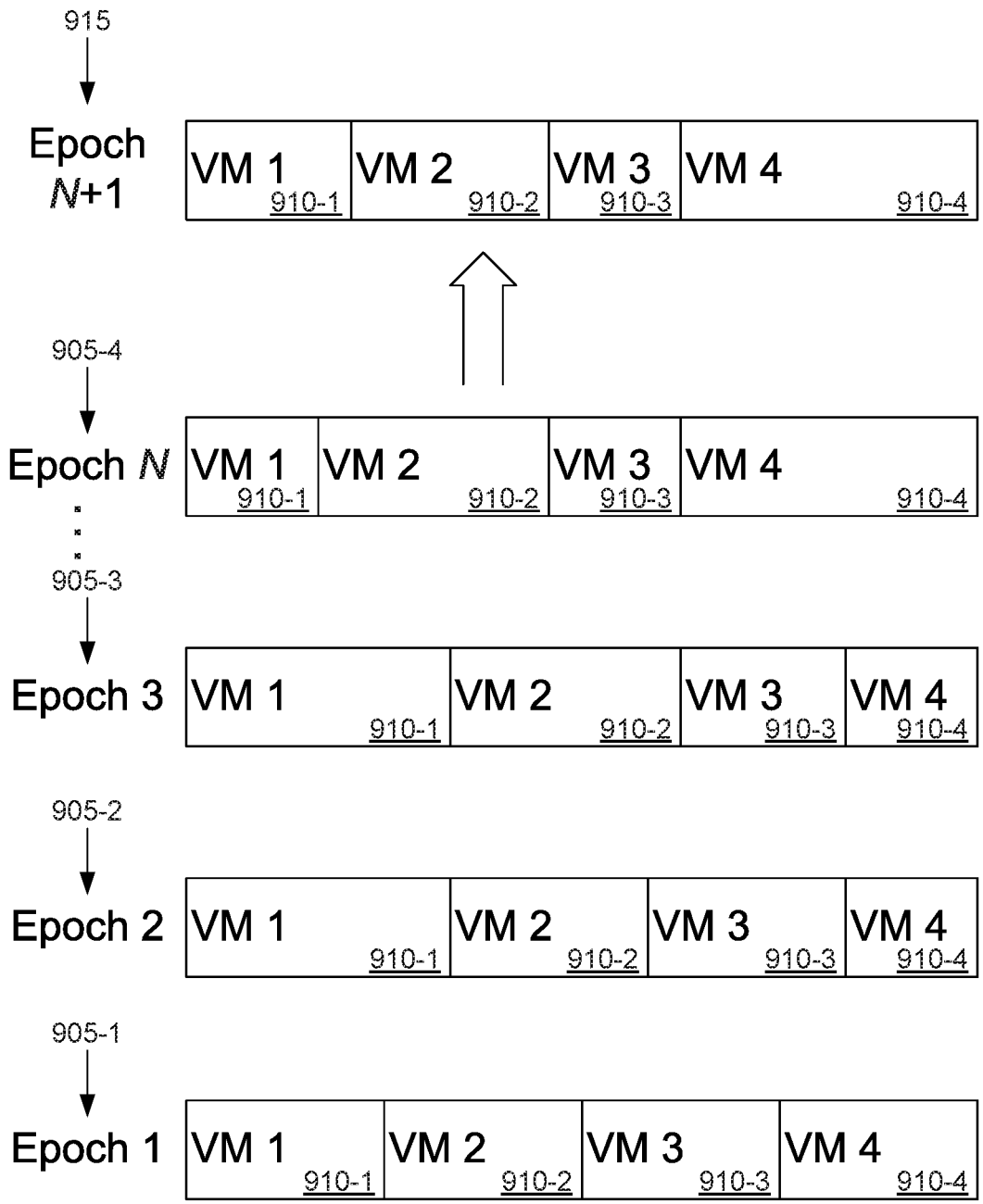
FIG. 9 shows how the performance guarantee zone of the cache of FIG. 1 may be divided into regions for virtual machines, according to an embodiment of the inventive concept.

In FIGS. 7-8, DCPM Daemon 325 of FIG. 3 may manage the allocation of cache 125 of FIG. 1 to performance guarantee zone 505 and spike buffer zone 510. But this allocation does not end the analysis. Performance guarantee zone 505 is intended to reserve a portion of cache 125 of FIG. 1 to each virtual machine 305-1, 305-2, and 305-3 of FIG. 3. But like the allocation between performance guarantee zone 505 and spike buffer zone 510, the amount of performance guarantee zone 505 reserved for each virtual machine 305-1, 305-2 and 305-3 of FIG. 3 might need to change over time to better reflect the changing needs of each virtual machine. FIG. 9 represents how an embodiment of the inventive concept may adjust the allocation of performance guarantee zone 505 to each virtual machine.

In FIG. 9, a history of N epochs 905-1, 905-2, 905-3, and 905-4, with epoch 905-4 being the most recent (i.e., current) epoch. Within each epoch, allocations (called "regions") 910-1, 910-2, 910-3, and 910-4 are shown, each region representing a portion of performance guarantee zone 505 of FIGS. 5A-5C for four virtual machines. As may be seen, over time regions 910-1 through 910-4 have changed in allocation. Initially, during epoch 910-1, all four regions 910-1 through 910-4 are allocated equal percentages of performance guarantee zone 505 of FIGS. 5A-5C. Later, during epoch 905-2, region 910-1 is allocated a larger percentage of performance guarantee zone 505 of FIGS. 5A-5C, and region 910-4 is allocated a smaller percentage. Still later, during epoch 905-4, region 910-1 is allocated a small percentage of performance guarantee zone 505 of FIGS. 5A-5C, and region 910-4 is allocated the largest percentage.

To determine the allocation for regions 910-1 through 910-4 may use a selection statistic. This selection statistic may be used relative to the data in regions 910-1 through 910-4 to select various datasets for each virtual machine. The selected datasets may then be compared in size, and regions 910-1 through 910-4 may then be allocated in proportion to the sizes of the datasets for each virtual machine for new epoch 915. Data in regions 910-1 through 910-4 may be compared with the selection statistic for just current epoch 905-4, or for all epochs 905-1 through 905-4. As discussed above with reference to FIG. 7, memory 120 of FIG. 1 may store historical information about past epochs 905-1 through 905-3 that may be used by DCPM Daemon 325 of FIG. 3. This historical information may include any desired data: for example, all past epochs, or a subset such as a sliding window containing the past, say, 5 or 10 epochs. In embodiments of the inventive concept where more than just current epoch 905-4 is considered, the contributions of past epochs may be equal, or they may be weighted using any desired weighting function. For example, a convolution function may be used to lessen the impact of older epochs in favor of newer epochs (which might better represent the current demands of virtual machines 305-1, 305-2, and 305-3 of FIG. 3).

In one embodiment of the inventive concept, the selection statistic may include set number of bins. For example, all the datasets stored performance guarantee zone 505 of FIGS. 5A-5C may be sorted: for example, in terms of their access counts. The value of the selection statistic-say, 1000 bins—may then be used to identify the bins to be considered within this sorted list: the bins with the highest 1000 access counts may be selected, and any other bins may be discarded. These selected datasets may then be divided according to the virtual machines accessing the data (that is, regions 910-1 through 910-4 in which the datasets were stored). The relative number of bins for each machine may then be used to determine relative size percentages for regions 910-1 through 910-4 for new epoch 915.

As a concrete example, consider a situation in which only current epoch 905-4 is considered. (Using only current epoch 905-4 could result in a poor allocation of cache resources due to I/O spikes, but this problem may be ignored for the purposes of a simple example.) Assume that, after sorting and applying the selection statistic, it turns out that two of the selected datasets were in region 910-1, three of the selected datasets were in region 910-2, one of the selected datasets was in region 910-3, and four of the selected datasets were in region 910-4. Then, for new epoch 915, performance guarantee zone 505 of FIGS. 5A-5C may be allocated to give region 910-1 20% of the resources, region 910-2 30% of the resources, region 910-3 10% of the resources, and region 910-4 40% of the resources.

Figure 10:
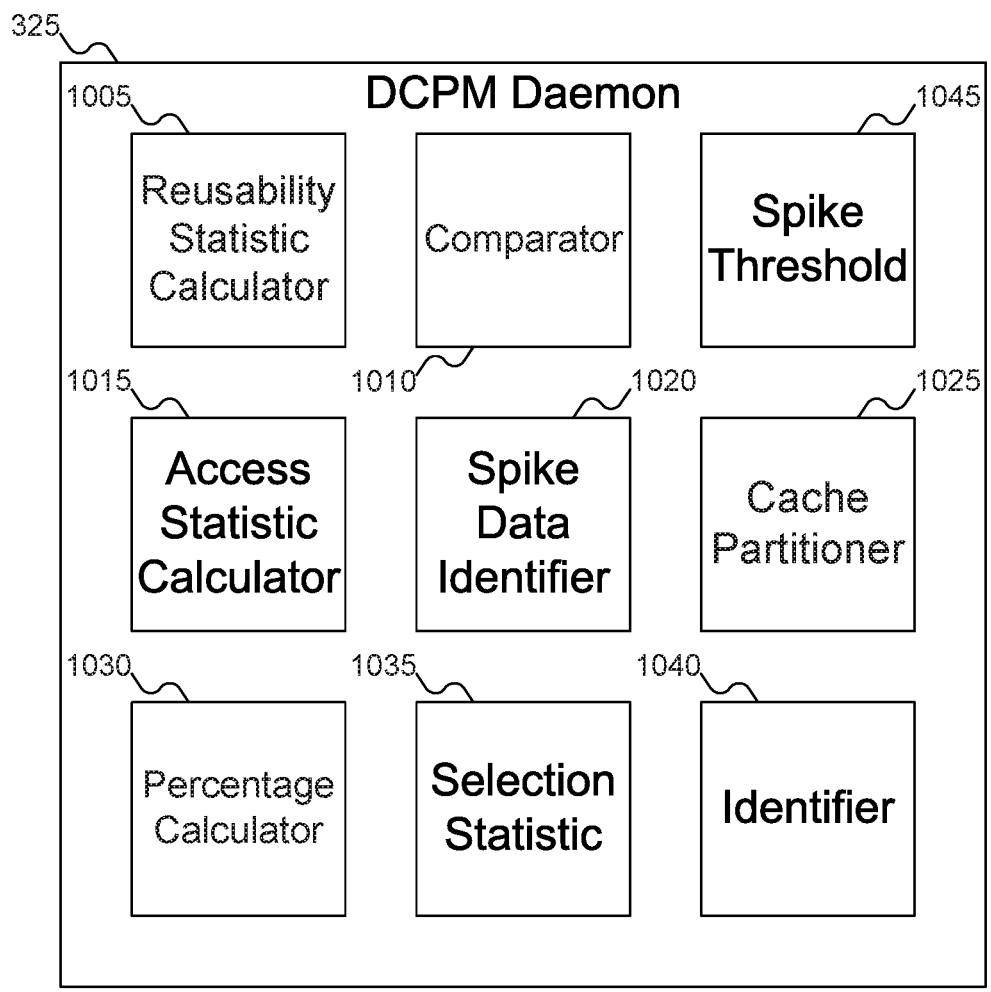
FIG. 10 shows details of the DCPM Daemon of FIG. 3.

FIG. 10 shows details of DCPM Daemon 325 of FIG. 3. In FIG. 10, DCPM Daemon 325 is shown as including reusability statistic calculator 1005, comparator 1010, access statistic calculator 1015, spike data identifier 1020, cache partitioner 1025, percentage calculator 1030, selection statistic 1035, and identifier 1040. Reusability statistic calculator 1005 may be used to calculate the reusability statistic used to determine whether there are workload I/O spikes. Comparator 1010 may be used to compare the reusability statistic with spike threshold 1045, which may represent a preset cutoff for whether workload I/O spikes justify an aggressive allocation strategy or a conservative allocation strategy. (Comparator 1010 may also be used for other comparisons: for example, comparing individual datasets in spike buffer zone 510 of FIGS. 5A-5C with the access statistic.) Access statistic calculator 1015 may calculate an access statistic, such as the average access count for data in performance guarantee zone 505 of FIGS. 5A-5C. Spike data identifier 1020 may be used to identify data in spike buffer zone 510 of FIGS. 5A-5C that satisfies the access statistic (for example, for use in the aggressive allocation strategy). Cache partitioner 1025 may be used to partition cache 125 of FIG. 1 into performance guarantee zone 505 of FIGS. 5A-5C and spike buffer zone 510 of FIGS. 5A-5C. Cache partitioner 1025 may also be used to divide performance guarantee zone 505 of FIGS. 5A-5C into regions 910-1 through 910-4 of FIG. 9. Percentage calculator 1030 may be used to calculate the percentages of data hits in performance guarantee zone 505 of FIGS. 5A-5C and spike buffer zone 510 of FIGS. 5A-5C (for example, for use in the conservative allocation strategy). Selection statistic 1035 may be a statistic, preset for example by the system administrator, used in selecting datasets when allocating the sizes of regions 910-1 through 910-4 of FIG. 9. And identifier 1040 may identify the percentage of datasets that satisfy selection statistic 1035 for each virtual machine, again for use in allocating the sizes of regions 910-1 through 910-4 of FIG. 9.

Figure 11A:
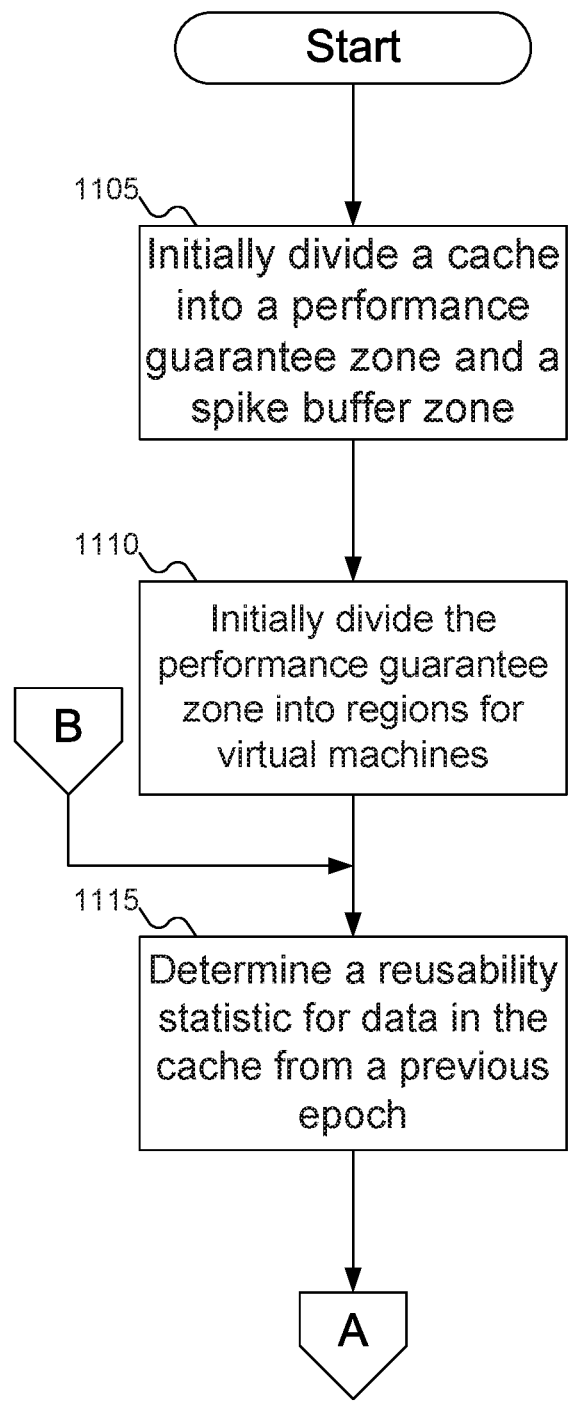
FIGS. 11A-11B show a flowchart of an example procedure for the DCPM Daemon of FIG. 3 to partition the cache of FIG. 1, according to an embodiment of the inventive concept.
Figure 11B:
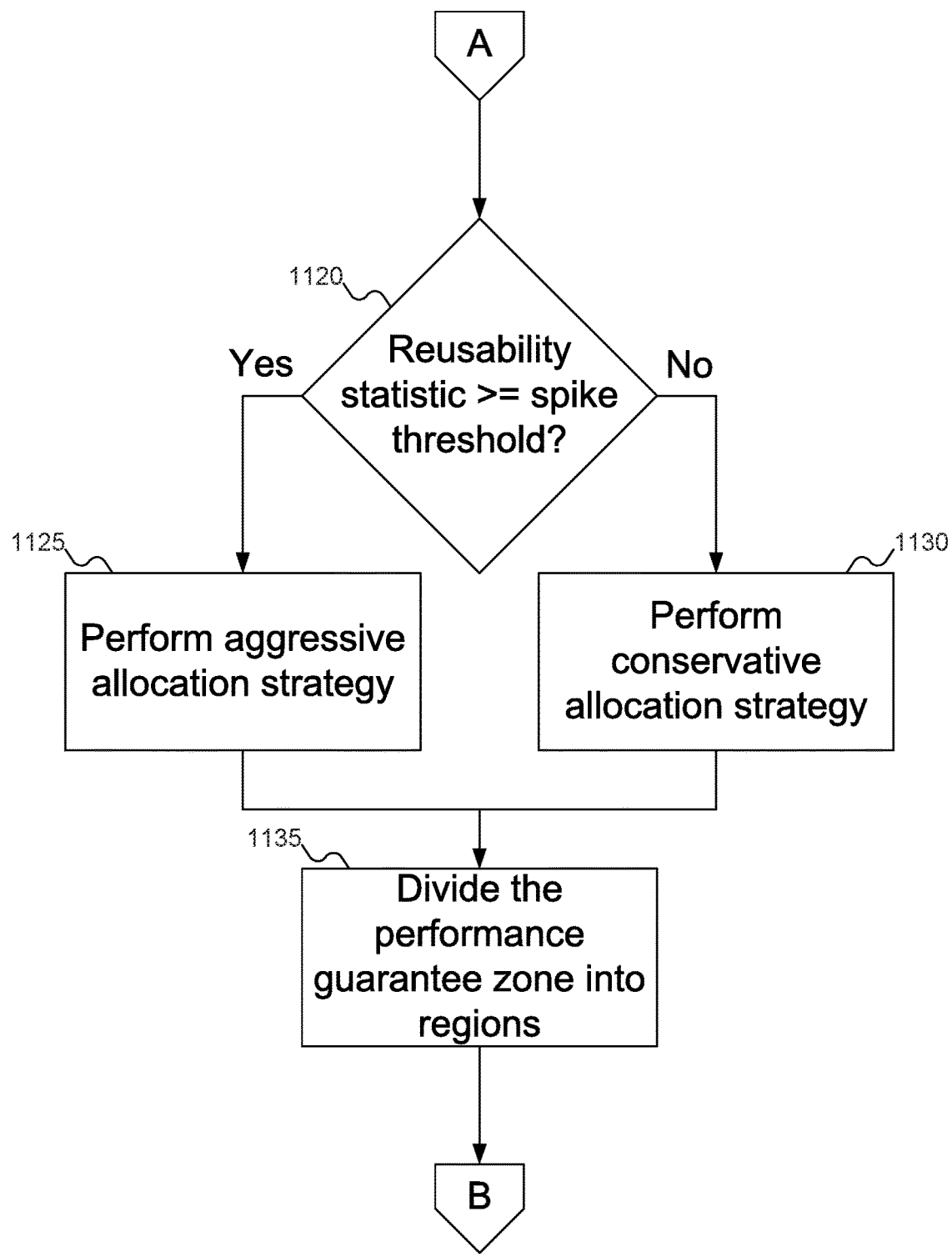

FIGS. 11A-11B show a flowchart of an example procedure for DCPM Daemon 325 of FIG. 3 to partition cache 125 of FIG. 1, according to an embodiment of the inventive concept. In FIG. 11A, at block 1105, cache partitioner 1025 of FIG. 10 may initially partition cache 125 of FIG. 1 into performance guarantee zone 505 of FIGS. 5A-5C and spike buffer zone 510 of FIGS. 5A-5C. This initial partition may allocate performance guarantee zone 505 of FIGS. 5A-5C and spike buffer zone 510 of FIGS. 5A-5C equally. At block 1110, cache partitioner 1025 of FIG. 10 may initially partition performance guarantee zone 505 of FIGS. 5A-5C into regions 910-1 through 910-4, one for each virtual machine. Again, this initial partition allocate equal regions 910-1 through 910-4.

When a new epoch begins, at block 1115, reusability statistic calculator 1005 of FIG. 10 may calculate the reusability statistic for the current epoch (and possibly previous epochs). At block 1120 (FIG. 11B), DCPM Daemon 325 of FIG. 3 may compare the reusability statistic with spike threshold 1045 of FIG. 10. If the reusability statistic is at least as large as spike threshold 1045 of FIG. 10, then at block 1125 DCPM Daemon 325 of FIG. 3 may use an aggressive allocation strategy. Otherwise, at block 1130, DCPM Daemon 325 of FIG. 3 may use a conservative allocation strategy. Either way, once cache 125 of FIG. 1 has been partitioned into performance guarantee zone 505 of FIGS. 5A-5C and spike buffer zone 510 of FIGS. 5A-5C, at block 1135 DCPM Daemon 325 of FIG. 3 may partition performance guarantee zone 505 of FIGS. 5A-5C into regions 910-1 through 910-4 of FIG. 9. Processing may then return to block 1115 for repartitioning when the next epoch arrives.

FIG. 12 shows a flowchart of an example procedure for DCPM Daemon 325 of FIG. 3 to partition cache 125 of FIG. 1 using an aggressive allocation strategy, according to an embodiment of the inventive concept. In FIG. 12, at block 1205, access statistic calculator 1015 of FIG. 10 may calculate an access statistic, such as the average access count or the average access time, for data in performance guarantee zone 505 of FIGS. 5A-5C. At block 1210, spike data identifier 1020 of FIG. 10 may identify data in spike buffer zone 510 of FIGS. 5A-5C that satisfies the access statistic. At block 1215, cache partitioner 1025 of FIG. 10 may partition cache 125 of FIG. 1 into performance guarantee zone 505 of FIGS. 5A-5C and spike buffer zone 510 of FIGS. 5A-5C for next epoch 915 of FIG. 9 so that spike buffer zone 510 of FIGS. 5A-5C has enough storage to store the identified data.

The reason why block 1210 filters data in spike buffer zone 510 of FIGS. 5A-5C is that there might be data that is used only one time, and does not really need to be in caches 125 and/or 330 of FIG. 3 even if there was a data spike. For example, a video segment accessed over a network is likely watched once, then no longer needed. Such a datum does not need to be stored in caches 125 and/or 330 of FIG. 3, and may safely be filtered out when determining the appropriate size of spike buffer zone 510 of FIGS. 5A-5C for next epoch 915 of FIG. 9.

Information about access statistics may be stored in RAM, rather than in caches 125 and/or 330 of FIG. 3. For example, RAM may be used to store metadata about caches 1235 and/or 330 of FIG. 3. An access count that is 32 bits wide may track billions of accesses of a particular address, or may store quite accurately an access time measured in small fractions of a second. Thus, the amount of metadata that may be stored is quite small relative to the data itself. By storing metadata in RAM (or some other storage that is faster still than caches 125 and/or 330 of FIG. 3), generating the access statistic as described in block 1205 of FIG. 12 may be done very efficiently.

In FIG. 12, blocks 1205 and 1210 may be performed using data from just previous epoch 905-4 of FIG. 9. But blocks 1205 and 1210 may also be performed using data from the sliding window of any desired number of previous epochs 905-1 through 905-4 of FIG. 9. By using additional epochs, the number of data in spike buffer zone 510 of FIGS. 5A-5C that satisfy the access statistic is almost certainly larger than the number of data in spike buffer zone 510 of FIGS. 5A-5C of previous epoch 905-4 of FIG. 9, which may increase the size of spike buffer zone 510 of FIGS. 5A-5C relative to previous epoch 905-4 of FIG. 9. Since FIG. 12 is used when workload spikes have been detected, increasing the size of spike buffer zone 510 of FIGS. 5A-5C is typically desirable, although spike buffer zone 510 of FIGS. 5A-5C should not grow so large as to affect performance guarantee zone 505 of FIGS. 5A-5C (for example, by making performance guarantee zone 505 of FIGS. 5A-5C too small to support the normal workloads of virtual machines 305-1 through 305-3 of FIG. 3).

In block 1205, if a sliding window of epochs is used to determine the access statistic, in some embodiments of the inventive concept the access statistic may be calculated for data that was stored in performance guarantee zone 505 of FIGS. 5A-5C in any of the previous epochs (whether or not that data was found in performance guarantee zone 505 of FIGS. 5A-5C in previous epoch 905-4 of FIG. 9). In other embodiments of the inventive concept, the access statistic may be calculated only for data found in performance guarantee zone 505 of FIGS. 5A-5C in previous epoch 905-4 of FIG. 9. That is, if a particular datum was not found in performance guarantee zone 505 of FIGS. 5A-5C in previous epoch 905-4 of FIG. 9, then that datum's metadata is not used in calculating the access statistic.

Blocks 1205 and 1210 may also use windows of different widths in some embodiments of the inventive concept. For example, a large sliding window (say, 10 epochs) might be used in block 1205 to determine the access statistic, but a small sliding window (say, one or two epochs) might be used in block 1210 to determine which data satisfy the access statistic.

FIG. 13 shows a flowchart of an example procedure for DCPM Daemon 325 of FIG. 3 to partition cache 125 of FIG. 1 using a conservative allocation strategy, according to an embodiment of the inventive concept. In FIG. 13, at block 1305, percentage calculator 1030 of FIG. 10 may calculate percentage 705 of FIG. 7 of hits in cache 125 of FIG. 1 that were in performance guarantee zone 505 of FIGS. 5A-5C. At block 1310, percentage calculator 1030 of FIG. 10 may calculate percentage 710 of FIG. 7 of hits in cache 125 of FIG. 1 that were in spike buffer zone 510 of FIGS. 5A-5C. At block 1315, cache partitioner 1025 of FIG. 10 may partition cache 125 of FIG. 1 into performance guarantee zone 505 of FIGS. 5A-5C and spike buffer zone 510 of FIGS. 5A-5C for next epoch 915 of FIG. 9 in proportion to percentages 705 and 710 of FIG. 7 of hits in performance guarantee zone 505 of FIGS. 5A-5C and spike buffer zone 510 of FIGS. 5A-5C.

Figure 14:
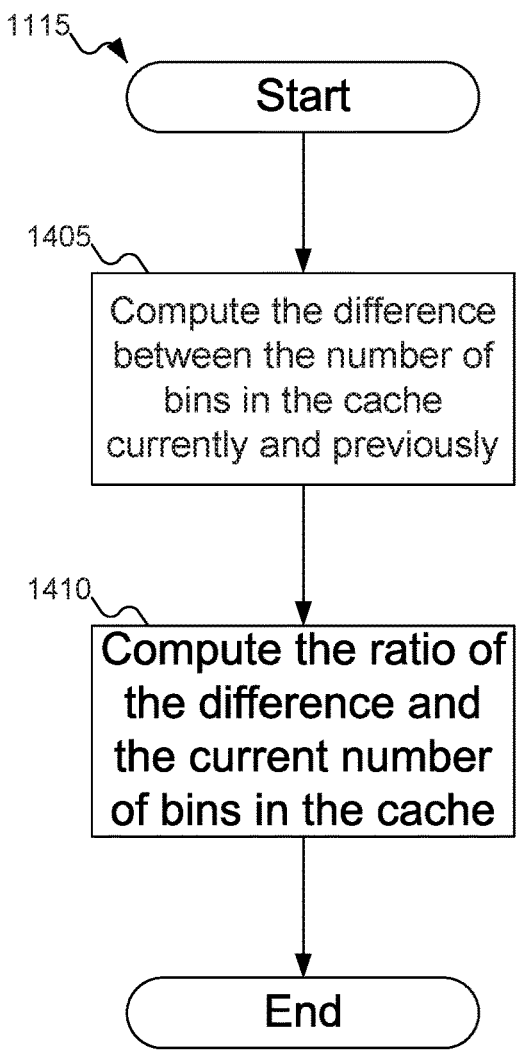
FIG. 14 shows a flowchart of an example procedure for the DCPM Daemon of FIG. 3 to calculate a reusability statistic, according to an embodiment of the inventive concept.

FIG. 14 shows a flowchart of an example procedure for DCPM Daemon 325 of FIG. 3 to calculate a reusability statistic, according to an embodiment of the inventive concept. In FIG. 14, at block 1405, reusability statistic calculator 1005 of FIG. 10 may calculate the difference between the number of bins in the cache in current epoch 905-4 and past epochs 905-1, 905-2, and/or 905-3. At block 1410, reusability statistic calculator 1005 of FIG. 10 may divide that difference by the number of bins in cache 125 of FIG. 1 in current epoch 905-4.

Figure 15:
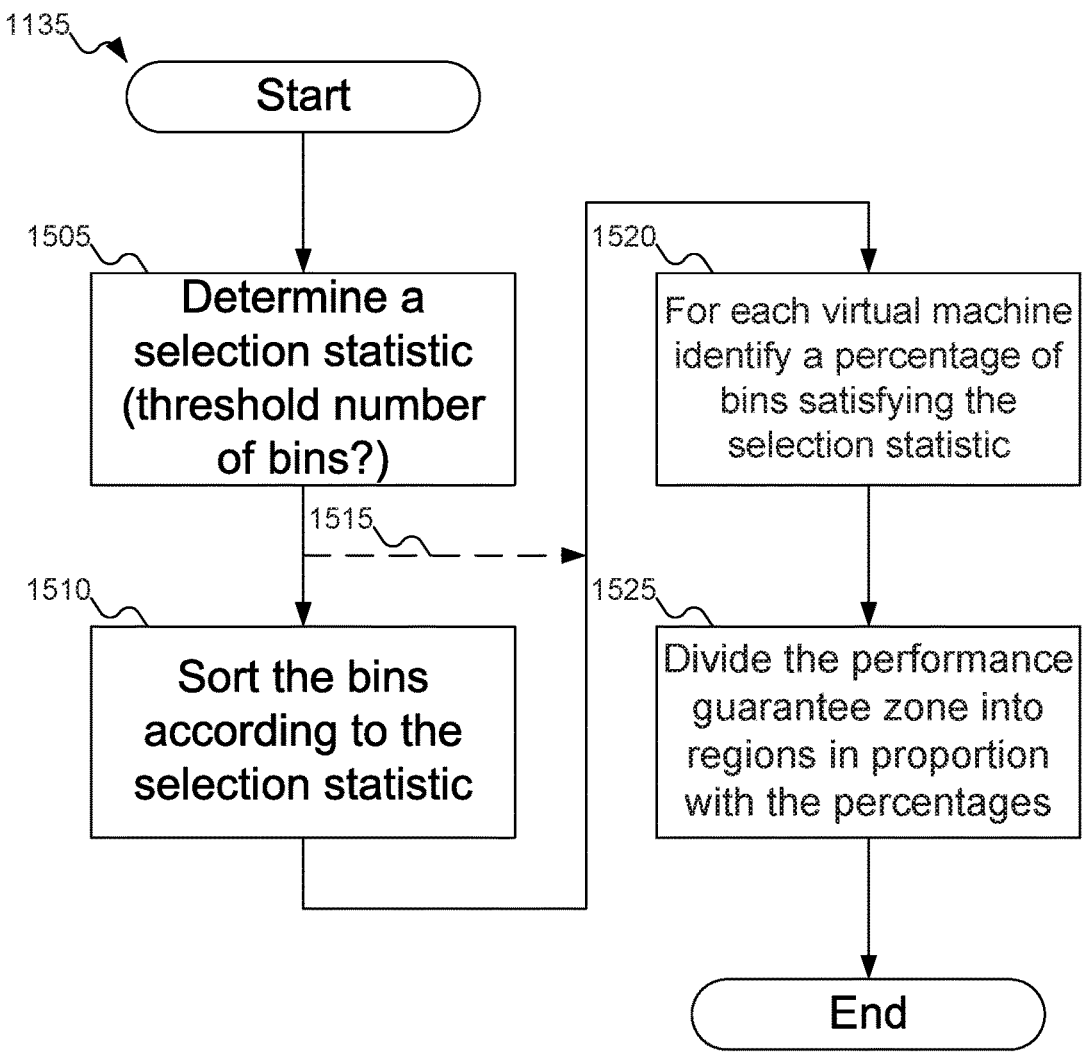
FIG. 15 shows a flowchart of an example procedure for the DCPM Daemon of FIG. 3 to divide the performance guarantee zone of FIGS. 5A-5C into regions for the virtual machines, according to an embodiment of the inventive concept.

FIG. 15 shows a flowchart of an example procedure for DCPM Daemon 325 of FIG. 3 to divide performance guarantee zone 505 of FIGS. 5A-5C into regions 910-1 through 910-4 of FIG. 9 for the virtual machines, according to an embodiment of the inventive concept. In FIG. 15, at block 1505, selection statistic 1035 of FIG. 10 may be determined. As discussed above, selection statistic 1035 of FIG. 10 may be preset by the system administrator. At block 1510, DCPM Daemon 325 of FIG. 3 may sort the bins in cache 125 of FIG. 1. How the bins are sorted may depend on the selection statistic used. For example, if selection statistic 1035 of FIG. 10 is to select bins based on the bins that are most used, then the bins may be sorted by access count. Whether the bins need to be sorted depends on selection statistic 1035 of FIG. 10: in some embodiments of the inventive concept, block 1510 may be omitted, as shown by dashed line 1515. At block 1520, the percentage of bins that satisfy selection statistic 1035 of FIG. 10 in each virtual machine may be computed. Finally, at block 1525, cache partitioner 1025 of FIG. 10 may partition performance guarantee zone 505 of FIGS. 5A-5C into regions 910-1 through 910-4 in proportion to the percentage of bins that satisfy selection statistic 1035 of FIG. 10 in each virtual machine.

In FIGS. 11A-15, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a virtual machine server, compnsing:

a processor;

a memory;

at least two virtual machines stored in the memory and running on the processor;

a virtual machine hypervisor to manage the operations of the at least two virtual machines;

a cache including at least one storage device; and a Dynamic Cache Partition Manager (DCPM) to manage the division of the cache into a performance guarantee zone and a spike buffer zone in each of a plurality of epochs, the performance guarantee zone including regions for each of the at least two virtual machines, the spike buffer zone storing workload spike data for the at least two virtual machines, the DCPM including:
- a reusability statistic calculator to calculate a reusability statistic for data stored in the cache during a previous epoch;
- a comparator to compare the reusability statistic with a spike threshold;
- an access statistic calculator to calculate an access statistic for first data stored in a first performance guarantee zone during the previous epoch;
- a spike data identifier to identify second data in a first spike buffer zone during the previous epoch that satisfies the access statistic; and
- a cache partitioner to partition the cache into a second performance guarantee zone for a new epoch and a second spike buffer zone for the new epoch so that the second spike buffer zone is large enough to store the second data.

Statement 2. An embodiment of the inventive concept includes a system according to statement 1, wherein the DCPM is included in one of the virtual machine server and a data center server.

Statement 3. An embodiment of the inventive concept includes a virtual machine server according to statement 2, wherein:
the access statistic calculator is operative to calculate an average access count for the first data stored in the performance guarantee zone during the previous epoch; and
the spike data identifier is operative to identify the second data in the first spike buffer zone during the previous epoch with access counts greater than the average access count.

Statement 4. An embodiment of the inventive concept includes a virtual machine server according to statement 3, wherein:
the access statistic calculator is operative to calculate an average access count for the first data in the performance guarantee zone during a plurality of previous epochs; and
the spike data identifier is operative to identify the second data in the first spike buffer zone during the plurality of previous epochs with access counts greater than the average access count.

Statement 5. An embodiment of the inventive concept includes a virtual machine server according to statement 2, wherein:
the DCPM further includes a percentage calculator to calculate a first percentage of hits in the performance guarantee zone during the previous epoch and a second percentage of hits in the spike buffer zone during the previous epoch; and
the cache partitioner is operative to partition the cache in the virtual machine server into a third performance guarantee zone and a third spike buffer zone proportional to the first percentage of hits and the second percentage of hits.

Statement 6. An embodiment of the inventive concept includes a virtual machine server according to statement 5, wherein the percentage calculator is operative to calculate a first percentage of hits in the performance guarantee zone during a plurality of previous epochs and a second percentage of hits in the spike buffer zone during the plurality of previous epochs.

Statement 7. An embodiment of the inventive concept includes a virtual machine server according to statement 2, wherein the reusability statistic calculator is operative to calculate the reusability statistic as a difference between a current number of bins in the cache in the previous epoch and a previous number of bins in the cache in a second previous epoch, divided by the current number of bins in the cache in the previous epoch.

Statement 8. An embodiment of the inventive concept includes a virtual machine server according to statement 7, wherein the reusability statistic calculator is operative to calculate the difference between the current number of bins in the cache in the previous epoch and the previous number of bins in the cache in the second previous epoch as a smallest difference between the current number of bins in the cache in the previous epoch and a plurality of previous numbers of bins in the cache in a plurality of previous epochs.

Statement 9. An embodiment of the inventive concept includes a virtual machine server according to statement 2, wherein:
the DCPM includes:
a selection statistic; and
an identifier to identify a percentage of the first data in the first performance guarantee zone during the previous epoch that satisfy the selection statistic for each virtual machine storing data in the first performance guarantee zone; and
the cache partitioner is operative to allocate a plurality of regions in the second performance guarantee zone for the new epoch in proportion to the percentages for each virtual machine.

Statement 10. An embodiment of the inventive concept includes a virtual machine server according to statement 9, wherein:
the selection statistic includes a threshold number of bins; and
the identifier is operative to identify a subset of the plurality of bins with corresponding access counts that exceeds the threshold number of bins.

Statement 11. An embodiment of the inventive concept includes a virtual machine server according to statement 9, wherein the selection statistic includes the selection statistic for the first data in the first performance guarantee zone during the previous epoch.

Statement 12. An embodiment of the inventive concept includes a virtual machine server according to statement 9, wherein the selection statistic includes the selection statistic for the first data in the first performance guarantee zone during a plurality of previous epochs.

Statement 13. An embodiment of the inventive concept includes a virtual machine server according to statement 12, wherein the memory stores a history of sizes of the regions during the plurality of previous epochs.

Statement 14. An embodiment of the inventive concept includes a virtual machine server according to statement 9, wherein the regions for each of the at least two virtual machines in the first performance guarantee zone are initially allocated in equal sizes.

Statement 15. An embodiment of the inventive concept includes a virtual machine server according to statement 9, wherein the regions for each of the at least two virtual machines in the first performance guarantee zone are initially allocated in proportion to at least two weights correlated to at least two service level agreements for the at least two virtual machines.

Statement 16. An embodiment of the inventive concept includes a virtual machine server according to statement 2, wherein the first performance guarantee zone and the spike buffer zone are initially allocated in equal sizes.

Statement 17. An embodiment of the inventive concept includes a system, comprising:

at least two virtual machine servers, each of the at least two virtual machine servers including:
  a processor;
  a memory;
  at least one virtual machine; and
  a virtual machine hypervisor to manage the operations of the at least one virtual machine;
at least one cache including at least one storage device; and
a Dynamic Cache Partition Manager (DCPM) Controller to manage the division of the at least one cache into a performance guarantee zone and a spike buffer zone in each of a plurality of epochs, the performance guarantee zone including regions for each of the at least one virtual machine on each of the at least two virtual machine servers, the spike buffer zone storing workload spike data for each of the at least one virtual machine on each of the at least two virtual machine servers, the DCPM Controller including:
  a reusability statistic calculator to calculate a reusability statistic for data stored in the at least one cache during a previous epoch;
  a comparator to compare the reusability statistic with a spike threshold;
  an access statistic calculator to calculate an access statistic for first data stored in a first performance guarantee zone during the previous epoch;
  a spike data identifier to identify second data in a first spike buffer zone during the previous epoch that satisfies the access statistic; and
  a cache partitioner to partition the at least one cache into a second performance guarantee zone for a new epoch and a second spike buffer zone for the new epoch so that the second spike buffer zone is large enough to store the second data.

Statement 18. An embodiment of the inventive concept includes a system according to statement 17, further comprising a data center server, the data center server including the DCPM Controller.

Statement 19. An embodiment of the inventive concept includes a system according to statement 18, wherein the data center server further includes the at least one cache.

Statement 20. An embodiment of the inventive concept includes a system according to statement 18, wherein the at least one cache is located on a machine other than the virtual machine server and the data center server.

Statement 21. An embodiment of the inventive concept includes a system according to statement 18, wherein each of the at least two virtual machine servers includes a DCPM Daemon to monitor workloads for the at least one virtual machine.

Statement 22. An embodiment of the inventive concept includes a system according to statement 17, wherein:
  the access statistic calculator is operative to calculate an average access count for the first data stored in the performance guarantee zone during the previous epoch; and
  the spike data identifier is operative to identify the second data in the first spike buffer zone during the previous epoch with access counts greater than the average access count.

Statement 23. An embodiment of the inventive concept includes a system according to statement 22, wherein:
  the access statistic calculator is operative to calculate an average access count for the first data in the performance guarantee zone during a plurality of previous epochs; and
  the spike data identifier is operative to identify the second data in the first spike buffer zone during the plurality of previous epochs with access counts greater than the average access count.

Statement 24. An embodiment of the inventive concept includes a system according to statement 17, wherein:
  the DCPM Controller further includes a percentage calculator to calculate a first percentage of hits in the performance guarantee zone during the previous epoch and a second percentage of hits in the spike buffer zone during the previous epoch; and
  the cache partitioner is operative to partition the cache in the virtual machine server into a third performance guarantee zone and a third spike buffer zone proportional to the first percentage of hits and the second percentage of hits.

Statement 25. An embodiment of the inventive concept includes a system according to statement 24, wherein the percentage calculator is operative to calculate a first percentage of hits in the performance guarantee zone during a plurality of previous epochs and a second percentage of hits in the spike buffer zone during the plurality of previous epochs.

Statement 26. An embodiment of the inventive concept includes a system according to statement 17, wherein the reusability statistic calculator is operative to calculate the reusability statistic as a difference between a current number of bins in the cache in the previous epoch and a previous number of bins in the cache in a second previous epoch, divided by the current number of bins in the cache in the previous epoch.

Statement 27. An embodiment of the inventive concept includes a system according to statement 26, wherein the reusability statistic calculator is operative to calculate the difference between the current number of bins in the cache in the previous epoch and the previous number of bins in the cache in the second previous epoch as a smallest difference between the current number of bins in the cache in the previous epoch and a plurality of previous numbers of bins in the cache in a plurality of previous epochs.

Statement 28. An embodiment of the inventive concept includes a system according to statement 17, wherein:
  the DCPM Controller includes:
    a selection statistic; and
    an identifier to identify a percentage of the first data in the first performance guarantee zone during the previous epoch that satisfy the selection statistic for each virtual machine storing data in the first performance guarantee zone; and
  the cache partitioner is operative to allocate a plurality of regions in the second performance guarantee zone for the new epoch in proportion to the percentages for each virtual machine.

Statement 29. An embodiment of the inventive concept includes a system according to statement 28, wherein:
  the selection statistic includes a threshold number of bins; and
  the identifier is operative to identify a subset of the plurality of bins with corresponding access counts that exceeds the threshold number of bins.

Statement 30. An embodiment of the inventive concept includes a system according to statement 28, wherein the selection statistic includes the selection statistic for the first data in the first performance guarantee zone during the previous epoch.

Statement 31. An embodiment of the inventive concept includes a system according to statement 28, wherein the selection statistic includes the selection statistic for the first data in the first performance guarantee zone during a plurality of previous epochs.

Statement 32. An embodiment of the inventive concept includes a system according to statement 31, wherein the memory stores a history of sizes of the regions during the plurality of previous epochs.

Statement 33. An embodiment of the inventive concept includes a system according to statement 28, wherein the regions for each of the at least two virtual machines in the first performance guarantee zone are initially allocated in equal sizes.

Statement 34. An embodiment of the inventive concept includes a system according to statement 28, wherein the regions for each of the at least two virtual machines in the first performance guarantee zone are initially allocated in proportion to at least two weights correlated to at least two service level agreements for the at least two virtual machines.

Statement 35. An embodiment of the inventive concept includes a system according to statement 17, wherein the first performance guarantee zone and the spike buffer zone are initially allocated in equal sizes.

Statement 36. An embodiment of the inventive concept includes a method, comprising:

dividing a cache into a first performance guarantee zone and a first spike buffer zone;

determining a reusability statistic for data stored in the cache in a previous epoch; and if the reusability statistic is at least as large as a spike threshold:

determining an access statistic for first data stored in the first performance guarantee zone in a previous epoch;

identifying second data stored in the first spike buffer zone during the previous epoch that satisfies the access statistic; and redividing the cache into a second performance guarantee zone for a new epoch and a second spike buffer zone for the new epoch so that the second spike buffer zone is large enough to store the second data.

Statement 37. An embodiment of the inventive concept includes a method according to statement 36, wherein the cache is in one of a virtual machine server, a data center server, and a machine in a system including the virtual machine server and the data center server.

Statement 38. An embodiment of the inventive concept includes a method according to statement 36, wherein:

determining an access statistic for first data stored in the first performance guarantee zone in a previous epoch includes determining an average access count for first data stored in the first performance guarantee zone during the previous epoch; and identifying second data stored in the first spike buffer zone during the previous epoch that satisfies the access statistic includes identifying the second data stored in the first spike buffer zone during the previous epoch with access counts greater than the average access count.

Statement 39. An embodiment of the inventive concept includes a method according to statement 38, wherein:

determining an average access count for first data stored in the performance guarantee zone during the previous epoch includes determining the average access count for first data stored in the performance guarantee zone during a plurality of previous epochs; and identifying the second data stored in the first spike buffer zone during the previous epoch with access counts greater than the average access count includes identifying the second data stored in the first spike buffer zone during the plurality of previous epochs with access counts greater than the average access count.

Statement 40. An embodiment of the inventive concept includes a method according to statement 36, wherein, if the reusability statistic is less than the spike threshold:

determining a first percentage of hits in the performance guarantee zone during the previous epoch;

determining a second percentage of hits in the spike buffer zone during the previous epoch; and redividing the cache into a third performance guarantee zone and a third spike buffer zone proportional to the first percentage of hits and the second percentage of hits.

Statement 41. An embodiment of the inventive concept includes a method according to statement 40, wherein:

determining a first percentage of hits in the performance guarantee zone during the previous epoch includes determining the first percentage of hits in the performance guarantee zone during a plurality of previous epochs; and determining a second percentage of hits in the spike buffer zone during the previous epoch includes determining the second percentage of hits in the spike buffer zone during a plurality of previous epochs.

Statement 42. An embodiment of the inventive concept includes a method according to statement 36, wherein determining a reusability statistic for data stored in the cache in a previous epoch includes:

determining a difference between a current number of bins in the cache in the previous epoch and a previous number of bins in the cache in a second previous epoch; and determining a ratio of the difference and the current number of bins in the cache in the previous epoch.

Statement 43. An embodiment of the inventive concept includes a method according to statement 42, wherein:

determining a difference between a current number of bins in the cache in the previous epoch and a previous number of bins in the cache in a second previous epoch includes determining a smallest difference between the current number of bins in the cache in the previous epoch and a plurality of previous numbers of bins in the cache in a plurality of previous epochs; and determining a ratio of the difference and the current number of bins in the cache in the previous epoch includes determining the ratio of the smallest difference and the current number of bins in the cache in the previous epoch.

Statement 44. An embodiment of the inventive concept includes a method according to statement 36, further comprising:

determining a selection statistic for the first data in the first performance guarantee zone;

identifying a percentage of the first data in the first performance guarantee zone during the previous epoch that satisfy the selection statistic for each virtual machine storing data in the first performance guarantee zone; and allocating a plurality of regions in the second performance guarantee zone for the new epoch in proportion to the percentages for each virtual machine.

Statement 45. An embodiment of the inventive concept includes a method according to statement 44, wherein:

determining a selection statistic for the first data in the first performance guarantee zone during the previous epoch includes determining a threshold number of bins; and identifying a percentage of the first data in the first performance guarantee zone during the previous epoch that satisfy the selection statistic for each virtual machine storing data in the first performance guarantee zone includes:

sorting a plurality of bins in the first performance guarantee zone across all virtual machines by corresponding access counts; and selecting a subset of the plurality of bins as sorted by corresponding access counts that exceeds the threshold number of bins.

Statement 46. An embodiment of the inventive concept includes a method according to statement 44, wherein determining a selection statistic for the first data in the first performance guarantee zone includes determining the selection statistic for the first data in the first performance guarantee zone during the previous epoch.

Statement 47. An embodiment of the inventive concept includes a method according to statement 44, wherein identifying a percentage of the first data in the first performance guarantee zone during the previous epoch that satisfy the selection statistic for each virtual machine storing data in the first performance guarantee zone includes identifying the percentage of the first data in the first performance guarantee zone during a plurality of previous epochs that satisfy the selection statistic for each virtual machine storing data in the first performance guarantee zone.

Statement 48. An embodiment of the inventive concept includes a method according to statement 44, further comprising initially allocating the plurality of regions in the second performance guarantee zone for the new epoch in equal sizes.

Statement 49. An embodiment of the inventive concept includes a method according to statement 44, further comprising initially allocating the plurality of regions in proportion to a plurality of weights correlated to a plurality of service level agreements for the plurality of virtual machines.

Statement 50. An embodiment of the inventive concept includes a method according to statement 36, wherein dividing a cache into a first performance guarantee zone and a first spike buffer zone includes initially dividing the cache into equally sized first performance and first spike buffer zones.

Statement 51. An embodiment of the inventive concept includes an article, comprising a non-transitory storage medium, the non-transitory storage medium having stored thereon instructions that, when executed by a machine, result in:
 dividing a cache into a first performance guarantee zone and a first spike buffer zone;
 determining a reusability statistic for data stored in the cache in a previous epoch; and
 if the reusability statistic is at least as large as a spike threshold:
  determining an access statistic for first data stored in the first performance guarantee zone in a previous epoch;
  identifying second data stored in the first spike buffer zone during the previous epoch that satisfies the access statistic; and
  redividing the cache into a second performance guarantee zone for a new epoch and a second spike buffer zone for the new epoch so that the second spike buffer zone is large enough to store the second data.

Statement 52. An embodiment of the inventive concept includes an article according to statement 51, wherein the cache is in one of a virtual machine server, a data center server, and a machine in a system including the virtual machine server and the data center server.

Statement 53. An embodiment of the inventive concept includes an article according to statement 51, wherein:
 determining an access statistic for first data stored in the first performance guarantee zone in a previous epoch includes determining an average access count for first data stored in the first performance guarantee zone during the previous epoch; and
 identifying second data stored in the first spike buffer zone during the previous epoch that satisfies the access statistic includes identifying the second data stored in the first spike buffer zone during the previous epoch with access counts greater than the average access count.

Statement 54. An embodiment of the inventive concept includes an article according to statement 53, wherein:
 determining an average access count for first data stored in the performance guarantee zone during the previous epoch includes determining the average access count for first data stored in the performance guarantee zone during a plurality of previous epochs; and
 identifying the second data stored in the first spike buffer zone during the previous epoch with access counts greater than the average access count includes identifying the second data stored in the first spike buffer zone during the plurality of previous epochs with access counts greater than the average access count.

Statement 55. An embodiment of the inventive concept includes an article according to statement 51, wherein, if the reusability statistic is less than the spike threshold:
 determining a first percentage of hits in the performance guarantee zone during the previous epoch;
 determining a second percentage of hits in the spike buffer zone during the previous epoch; and
 redividing the cache into a third performance guarantee zone and a third spike buffer zone proportional to the first percentage of hits and the second percentage of hits.

Statement 56. An embodiment of the inventive concept includes an article according to statement 55, wherein:
 determining a first percentage of hits in the performance guarantee zone during the previous epoch includes determining the first percentage of hits in the performance guarantee zone during a plurality of previous epochs; and
 determining a second percentage of hits in the spike buffer zone during the previous epoch includes determining the second percentage of hits in the spike buffer zone during a plurality of previous epochs.

Statement 57. An embodiment of the inventive concept includes an article according to statement 51, wherein determining a reusability statistic for data stored in the cache in a previous epoch includes:
 determining a difference between a current number of bins in the cache in the previous epoch and a previous number of bins in the cache in a second previous epoch; and
 determining a ratio of the difference and the current number of bins in the cache in the previous epoch.

Statement 58. An embodiment of the inventive concept includes an article according to statement 57, wherein:
 determining a difference between a current number of bins in the cache in the previous epoch and a previous number of bins in the cache in a second previous epoch includes determining a smallest difference between the current number of bins in the cache in the previous epoch and a plurality of previous numbers of bins in the cache in a plurality of previous epochs; and
 determining a ratio of the difference and the current number of bins in the cache in the previous epoch includes determining the ratio of the smallest difference and the current number of bins in the cache in the previous epoch.

Statement 59. An embodiment of the inventive concept includes an article according to statement 51, the non-transitory storage medium having stored thereon further instructions that, when executed by the machine, result in:

determining a selection statistic for the first data in the first performance guarantee zone;

identifying a percentage of the first data in the first performance guarantee zone during the previous epoch that satisfy the selection statistic for each virtual machine storing data in the first performance guarantee zone; and allocating a plurality of regions in the second performance guarantee zone for the new epoch in proportion to the percentages for each virtual machine.

Statement 60. An embodiment of the inventive concept includes an article according to statement 59, wherein:

determining a selection statistic for the first data in the first performance guarantee zone during the previous epoch includes determining a threshold number of bins; and identifying a percentage of the first data in the first performance guarantee zone during the previous epoch that satisfy the selection statistic for each virtual machine storing data in the first performance guarantee zone includes:

sorting a plurality of bins in the first performance guarantee zone across all virtual machines by corresponding access counts; and selecting a subset of the plurality of bins as sorted by corresponding access counts that exceeds the threshold number of bins.

Statement 61. An embodiment of the inventive concept includes an article according to statement 59, wherein determining a selection statistic for the first data in the first performance guarantee zone includes determining the selection statistic for the first data in the first performance guarantee zone during the previous epoch.

Statement 62. An embodiment of the inventive concept includes an article according to statement 59, wherein identifying a percentage of the first data in the first performance guarantee zone during the previous epoch that satisfy the selection statistic for each virtual machine storing data in the first performance guarantee zone includes identifying the percentage of the first data in the first performance guarantee zone during a plurality of previous epochs that satisfy the selection statistic for each virtual machine storing data in the first performance guarantee zone.

Statement 63. An embodiment of the inventive concept includes an article according to statement 59, the non-transitory storage medium having stored thereon further instructions that, when executed by the machine, result in initially allocating the plurality of regions in the second performance guarantee zone for the new epoch in equal sizes.

Statement 64. An embodiment of the inventive concept includes an article according to statement 59, the non-transitory storage medium having stored thereon further instructions that, when executed by the machine, result in initially allocating the plurality of regions in proportion to a plurality of weights correlated to a plurality of service level agreements for the plurality of virtual machines.

Statement 65. An embodiment of the inventive concept includes an article according to statement 51, wherein dividing a cache into a first performance guarantee zone and a first spike buffer zone includes initially dividing the cache into equally sized first performance and first spike buffer zones.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
a virtual machine server, including:
a processor;
a memory;
at least two virtual machines stored in the memory and running on the processor;
a virtual machine hypervisor to manage the operations of the at least two virtual machines; and
a cache including at least one storage device; and
a Dynamic Cache Partition Manager (DCPM) to manage the division of the cache into a performance guarantee zone and a spike buffer zone in each of a plurality of epochs, the performance guarantee zone including regions for each of the at least two virtual machines, the spike buffer zone storing workload spike data for the at least two virtual machines, the DCPM including:
a reusability statistic calculator to calculate a reusability statistic for data stored in the cache during a previous epoch;
a comparator to compare the reusability statistic with a spike threshold;
an access statistic calculator to calculate an access statistic for first data stored in a first performance guarantee zone during the previous epoch;
a spike data identifier to identify second data in a first spike buffer zone during the previous epoch that satisfies the access statistic; and
a cache partitioner to partition the cache into a second performance guarantee zone for a new epoch and a second spike buffer zone for the new epoch so that the second spike buffer zone is large enough to store the second data.

2. A system according to claim 1, wherein the DCPM is included in one of the virtual machine server and a data center server.

3. A system according to claim 2, wherein:
the DCPM further includes a percentage calculator to calculate a first percentage of hits in the performance guarantee zone during the previous epoch and a second percentage of hits in the spike buffer zone during the previous epoch; and
the cache partitioner is operative to partition the cache in the virtual machine server into a third performance guarantee zone and a third spike buffer zone proportional to the first percentage of hits and the second percentage of hits.

4. A system according to claim 2, wherein the reusability statistic calculator is operative to calculate the reusability statistic as a difference between a current number of bins in the cache in the previous epoch and a previous number of bins in the cache in a second previous epoch, divided by the current number of bins in the cache in the previous epoch.

5. A system according to claim 2, wherein:
the DCPM includes:
a selection statistic; and
an identifier to identify a percentage of the first data in the first performance guarantee zone during the previous epoch that satisfy the selection statistic for each virtual machine storing data in the first performance guarantee zone; and the cache partitioner is operative to allocate a plurality of regions in the second performance guarantee zone for the new epoch in proportion to the percentages for each virtual machine.

6. A system according to claim 5, wherein:
the selection statistic includes a threshold number of bins; and
the identifier is operative to identify a subset of the plurality of bins with corresponding access counts that exceeds the threshold number of bins.

7. A system according to claim 5, wherein the regions for each of the at least two virtual machines in the first performance guarantee zone are initially allocated in proportion to at least two weights correlated to at least two service level agreements for the at least two virtual machines.

8. A system, comprising:
at least two virtual machine servers, each of the at least two virtual machine servers including:
a processor;
a memory;
at least one virtual machine; and
a virtual machine hypervisor to manage the operations of the at least one virtual machine;
at least one cache including at least one storage device; and
a Dynamic Cache Partition Manager (DCPM) Controller to manage the division of the at least one cache into a performance guarantee zone and a spike buffer zone in each of a plurality of epochs, the performance guarantee zone including regions for each of the at least one virtual machine on each of the at least two virtual machine servers, the spike buffer zone storing workload spike data for each of the at least one virtual machine on each of the at least two virtual machine servers, the DCPM Controller including:
a reusability statistic calculator to calculate a reusability statistic for data stored in the at least one cache during a previous epoch;
a comparator to compare the reusability statistic with a spike threshold;
an access statistic calculator to calculate an access statistic for first data stored in a first performance guarantee zone during the previous epoch;
a spike data identifier to identify second data in a first spike buffer zone during the previous epoch that satisfies the access statistic; and
a cache partitioner to partition the at least one cache into a second performance guarantee zone for a new epoch and a second spike buffer zone for the new epoch so that the second spike buffer zone is large enough to store the second data.

9. A system according to claim 8, further comprising a data center server, the data center server including the DCPM Controller.

10. A system according to claim 9, wherein the data center server further includes the at least one cache.

11. A system according to claim 9, wherein each of the at least two virtual machine servers includes a DCPM Daemon to monitor workloads for the at least one virtual machine.

12. A system according to claim 8, wherein:
the access statistic calculator is operative to calculate an average access count for the first data stored in the performance guarantee zone during the previous epoch; and the spike data identifier is operative to identify the second data in the first spike buffer zone during the previous epoch with access counts greater than the average access count.

13. A system according to claim 8, wherein:
the DCPM Controller includes:
a selection statistic; and
an identifier to identify a percentage of the first data in the first performance guarantee zone during the previous epoch that satisfy the selection statistic for each virtual machine storing data in the first performance guarantee zone; and
the cache partitioner is operative to allocate a plurality of regions in the second performance guarantee zone for the new epoch in proportion to the percentages for each virtual machine.

14. A system according to claim 13, wherein:
the selection statistic includes a threshold number of bins; and
the identifier is operative to identify a subset of the plurality of bins with corresponding access counts that exceeds the threshold number of bins.

15. A method, comprising:
dividing a cache into a first performance guarantee zone and a first spike buffer zone;
determining a reusability statistic for data stored in the cache in a previous epoch; and
if the reusability statistic is at least as large as a spike threshold:
determining an access statistic for first data stored in the first performance guarantee zone in a previous epoch;
identifying second data stored in the first spike buffer zone during the previous epoch that satisfies the access statistic; and
redividing the cache into a second performance guarantee zone for a new epoch and a second spike buffer zone for the new epoch so that the second spike buffer zone is large enough to store the second data.

16. A method according to claim 15, wherein the cache is in one of a virtual machine server, a data center server, and a machine in a system including the virtual machine server and the data center server.

17. A method according to claim 15, wherein:
determining an access statistic for first data stored in the first performance guarantee zone in a previous epoch includes determining an average access count for first data stored in the first performance guarantee zone during the previous epoch; and
identifying second data stored in the first spike buffer zone during the previous epoch that satisfies the access statistic includes identifying the second data stored in the first spike buffer zone during the previous epoch with access counts greater than the average access count.

18. A method according to claim 17, wherein:
determining an average access count for first data stored in the performance guarantee zone during the previous epoch includes determining the average access count for first data stored in the performance guarantee zone during a plurality of previous epochs; and
identifying the second data stored in the first spike buffer zone during the previous epoch with access counts greater than the average access count includes identifying the second data stored in the first spike buffer zone during the plurality of previous epochs with access counts greater than the average access count.

19. A method according to claim 15, wherein, if the reusability statistic is less than the spike threshold:

determining a first percentage of hits in the performance guarantee zone during the previous epoch;
determining a second percentage of hits in the spike buffer zone during the previous epoch; and
redividing the cache into a third performance guarantee zone and a third spike buffer zone proportional to the first percentage of hits and the second percentage of hits.

20. A method according to claim 19, wherein:
determining a first percentage of hits in the performance guarantee zone during the previous epoch includes determining the first percentage of hits in the performance guarantee zone during a plurality of previous epochs; and
determining a second percentage of hits in the spike buffer zone during the previous epoch includes determining the second percentage of hits in the spike buffer zone during a plurality of previous epochs.

21. A method according to claim 15, wherein determining a reusability statistic for data stored in the cache in a previous epoch includes:
determining a difference between a current number of bins in the cache in the previous epoch and a previous number of bins in the cache in a second previous epoch; and
determining a ratio of the difference and the current number of bins in the cache in the previous epoch.

22. A method according to claim 21, wherein:
determining a difference between a current number of bins in the cache in the previous epoch and a previous number of bins in the cache in a second previous epoch includes determining a smallest difference between the current number of bins in the cache in the previous epoch and a plurality of previous numbers of bins in the cache in a plurality of previous epochs; and
determining a ratio of the difference and the current number of bins in the cache in the previous epoch includes determining the ratio of the smallest difference and the current number of bins in the cache in the previous epoch.

23. A method according to claim 15, further comprising:
determining a selection statistic for the first data in the first performance guarantee zone;
identifying a percentage of the first data in the first performance guarantee zone during the previous epoch that satisfy the selection statistic for each virtual machine storing data in the first performance guarantee zone; and
allocating a plurality of regions in the second performance guarantee zone for the new epoch in proportion to the percentages for each virtual machine.

24. A method according to claim 23, wherein:
determining a selection statistic for the first data in the first performance guarantee zone during the previous epoch includes determining a threshold number of bins; and
identifying a percentage of the first data in the first performance guarantee zone during the previous epoch that satisfy the selection statistic for each virtual machine storing data in the first performance guarantee zone includes:
sorting a plurality of bins in the first performance guarantee zone across all virtual machines by corresponding access counts; and
selecting a subset of the plurality of bins as sorted by corresponding access counts that exceeds the threshold number of bins.

25. A method according to claim 23, wherein identifying a percentage of the first data in the first performance guarantee zone during the previous epoch that satisfy the selection statistic for each virtual machine storing data in the first performance guarantee zone includes identifying the percentage of the first data in the first performance guarantee zone during a plurality of previous epochs that satisfy the selection statistic for each virtual machine storing data in the first performance guarantee zone.

26. A method according to claim 23, further comprising initially allocating the plurality of regions in proportion to a plurality of weights correlated to a plurality of service level agreements for the plurality of virtual machines.

27. A method according to claim 15, wherein dividing a cache into a first performance guarantee zone and a first spike buffer zone includes initially dividing the cache into equally sized first performance and first spike buffer zones.

* * * * *